US012132967B2

(12) United States Patent
Hinds et al.

(10) Patent No.: US 12,132,967 B2
(45) Date of Patent: Oct. 29, 2024

(54) BIDIRECTIONAL PRESENTATION DATASTREAM USING CONTROL AND DATA PLANE CHANNELS

(71) Applicant: Tencent America LLC, Palo Alto, CA (US)

(72) Inventors: Arianne Hinds, Palo Alto, CA (US); Stephan Wenger, Hillsborough, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/851,838

(22) Filed: Jun. 28, 2022

(65) Prior Publication Data
US 2023/0007361 A1    Jan. 5, 2023

Related U.S. Application Data

(60) Provisional application No. 63/217,049, filed on Jun. 30, 2021.

(51) Int. Cl.
*H04N 21/643* (2011.01)
*H04N 21/6332* (2011.01)
(Continued)

(52) U.S. Cl.
CPC ....... *H04N 21/643* (2013.01); *H04N 21/6332* (2013.01); *H04N 21/6377* (2013.01);
(Continued)

(58) Field of Classification Search
CPC ............. H04N 21/643; H04N 21/6332; H04N 21/6377; H04N 21/6582; H04N 21/816; H04N 21/8586
See application file for complete search history.

(56) References Cited

U.S. PATENT DOCUMENTS 4,209,838 A * 6/1980 Alcorn, Jr. ............ G06F 13/374
                                                    710/119
9,462,089 B1 * 10/2016 Fallows .................. H04L 69/14
(Continued)

FOREIGN PATENT DOCUMENTS

JP        2015-515830 A      5/2015

OTHER PUBLICATIONS

Supplementary European Search Report issued Nov. 9, 2023 in Application No. 22834422.2, pp. 1-9.
(Continued)

*Primary Examiner* — Jefferey F Harold
*Assistant Examiner* — Franklin S Andramuno
(74) *Attorney, Agent, or Firm* — Arent Fox Schiff LLP

(57) ABSTRACT

Aspects of the disclosure provide methods and apparatuses for media processing. In some examples, an apparatus includes processing circuitry. The processing circuitry can exchange, with a server device, a plurality of control messages over a control plane channel that uses a first transport protocol. The plurality of control messages belongs to a control plane of a bidirectional protocol for immersive media distribution. The processing circuitry receives, from the server device, a first plurality of data messages over a first data plane channel that uses a second transport protocol. The first plurality of data messages belongs to a data plane of the bidirectional protocol and carries immersive media content. The processing circuitry presents the immersive media content carried by the first plurality of data messages.

18 Claims, 33 Drawing Sheets

(51) Int. Cl.
*H04N 21/6377* (2011.01)
*H04N 21/658* (2011.01)
*H04N 21/81* (2011.01)
*H04N 21/858* (2011.01)

(52) U.S. Cl.
CPC ....... *H04N 21/6582* (2013.01); *H04N 21/816* (2013.01); *H04N 21/8586* (2013.01)

(56) References Cited

U.S. PATENT DOCUMENTS

| | | | | |
|---|---|---|---|---|
| 10,250,673 | B1* | 4/2019 | Brooker | H04L 67/1097 |
| 10,735,825 | B1* | 8/2020 | Comito | H04N 21/64738 |
| 11,611,604 | B2* | 3/2023 | Park | H04L 65/1069 |
| 2006/0140146 | A1* | 6/2006 | Funk | H04L 47/24 |
| | | | | 370/466 |
| 2012/0144416 | A1* | 6/2012 | Wetzer | H04N 21/41265 |
| | | | | 725/14 |
| 2015/0256861 | A1 | 9/2015 | Oyman | |
| 2015/0295982 | A1 | 10/2015 | Kafle et al. | |
| 2022/0174152 | A1* | 6/2022 | Balasaygun | H04M 7/0072 |

OTHER PUBLICATIONS

Office Action received for Japanese Patent Application No. 2023-520279, mailed on Mar. 19, 2024, 28 pages (16 pages of English Translation and 12 pages of Original Document).

* cited by examiner

EXEMPLARY MESSAGES SENT FROM SERVER TO CLIENT

1. REQUEST TYPE AND MODEL OF CLIENT
2. REQUEST CLIENT CHARACTERISTICS
3. REQUEST CLIENT NEURAL NETWORK MODEL
4. REQUEST CURRENTLY CACHED ASSET URIs and TYPES
5. REQUEST ASSET STATES FOR ASSET TYPE
6. REQUEST ASSET STATE FOR ASSET TYPE AND SERVER ASSIGNED ID
7. REQUEST ASSET STATE FOR ASSET URI
8. REQUEST ACKNOWLEDGEMENT
9. RECEIVE ACKNOWLEDGEMENT
10. RECEIVE NEGATIVE ACKNOWLEDGEMENT WITH OPTIONAL ERROR CODES
11. RECEIVE SCENE MANIFEST WITH SERVER ASSIGNED ID AND URI
11.1. RECEIVE MANIFEST CONTROL
11.2. RECEIVE MANIFEST SCRIPT N
11.3. END SCRIPT N
11.4. RECEIVE SHADER N
11.5. END SHADER N
11.6. RECEIVE COMPONENT CONTROL WITH ASSETS OF TYPE
11.7. END COMPONENT
11.8. END MANIFEST
12. RECEIVE STATIC TEXTURE ASSET WITH SERVER ASSIGNED ID AND URI
12.1. RECEIVE STATIC TEXTURE ASSET CONTROL INFORMATION
12.2. RECEIVE TEXTURE BASE LAYER
12.3. RECEIVE TEXTURE ENHANCEMENT LAYER #N
12.4. END TEXTURE ASSET
13. RECEIVE POINT CLOUD ASSET WITH SERVER ASSIGNED ID AND URI
13.1. RECEIVE POINT CLOUD ASSET CONTROL INFORMATION
13.2. RECEIVE POINT CLOUD BASE LAYER
13.3. RECEIVE POINT CLOUD ENHANCEMENT LAYER #N
13.4. END POINT CLOUD ASSET
14. RECEIVE MESH ASSET WITH SERVER ASSIGNED ID AND URI
14.1. RECEIVE MESH CONTROL INFORMATION
14.2. RECEIVE MESH BASE LAYER
14.3. RECEIVE MESH ENHANCEMENT LAYER #N
14.4. END MESH ASSET
15. RECEIVE HAPTIC ASSET WITH SERVER ASSIGNED ID AND URI
15.1. RECEIVE HAPTIC CONTROL INFORMATION
15.2. RECEIVE HAPTIC BASE LAYER
15.3. RECEIVE HAPTIC ENHANCEMENT LAYER #N
15.4. END HAPTIC ASSET

FIG. 16A

```
16.     RECEIVE VIDEO ASSET WITH SERVER ASSIGNED ID AND URI
16.1.   RECEIVE HIGH LEVEL CONTROL INFORMATION
16.2.   RECEIVE GOP LEVEL CONTROL INFORMATION
16.3.   RECEIVE TILE LEVEL CONTROL INFORMATION
16.4.   RECEIVE FRAME LEVEL CONTROL INFORMATION
16.5.   RECEIVE VIDEO ASSET BASE LAYER
16.6.   RECEIVE VIDEO ASSET ENHANCEMENT LAYER
16.7.   END VIDEO ASSET
17.     RECEIVE NEURAL NETWORK MODEL WITH SERVER ASSIGNED ID AND URI
17.1.   RECEIVE NEURAL NETWORK MODEL CONTROL INFORMATION
17.2.   RECEIVE NEURAL NETWORK MODEL LAYER N
17.3.   END NEURAL NETWORK
18.     ASSIGN SERVER ASSIGNED ID TO ASSET URI
19.     FETCH ASSET URI FROM LOCATION XXX.XXX.XXX.XXX ON NETWORK
20.     CLEAR CACHED ASSETS
```

*FIG. 16B*

EXEMPLARY MESSAGES SENT FROM CLIENT TO NETWORK

| | |
|---|---|
| 21. | RECEIVE ACKNOWLEDGMENT |
| 22. | RECEIVE NEGATIVE ACKNOWLEDGMENT WITH OPTIONAL ERROR CODES |
| 23. | RECEIVE NEURAL NETWORK MODEL WITH CLIENT ASSIGNED ID AND URI |
| 23.1. | RECEIVE NEURAL NETWORK MODEL CONTROL INFORMATION |
| 23.2. | RECEIVE NEURAL NETWORK MODEL LAYER N |
| 23.3. | END NEURAL NETWORK |
| 24. | REQUEST SCENE MANIFEST WITH URI |
| 25. | RECEIVE CLIENT CHARACTERISTICS |
| 26. | REQUEST VIDEO ASSET WITH URI |
| 27. | REQUEST POINT CLOUD ASSET WITH URI |
| 28. | REQUEST MESH ASSET WITH URI |
| 29. | REQUEST HAPTIC ASSET WITH URI |
| 30. | RECEIVE CURRENT RESOURCE STATE |
| 31. | RECEIVE CURRENT ASSETS |

*FIG. 16C*

| Message | Definition |
|---|---|
| REQUEST TYPE AND MODEL OF CLIENT | requests that the client return information about its type and model |
| REQUEST CLIENT CHARACTERISTICS: | requests that the client provide information about its capacity for storage, available GPUs/CPUs, input media formats supported, video resolutions supported, HDR curves supported, color gamuts supported, neural network models available, and current network down speed |
| REQUEST CLIENT NEURAL NETWORK MODEL | requests that the client provide one of its available neural network models |
| REQUEST CURRENTLY CACHED ASSET URIs and TYPES | requests that the client provide a list of asset types and their URIs for assets that are cached in immutable storage and that can be shared across media processing requests |
| REQUEST ASSET STATES FOR ASSET TYPE | requests that the client return status updates for each of the assets that is has access to within its internal/external storage or cache |
| REQUEST ASSET STATE FOR ASSET TYPE AND SERVER ASSIGNED ID | requests that the client returns the current state (e.g., available, in-use, unavailable, ...) for a particular asset type and a particular server assigned identifier |
| REQUEST ASSET STATE FOR ASSET URI | requests that the client returns the current state (e.g., available, in-use, unavailable, ...) for a particular asset type and a particular asset URI |
| REQUEST ACKNOWLEDGEMENT | requests that the client return an acknowledgement with information about its current state, or a negative acknowledgement with information pertaining to an error that it has recently encountered |

*FIG. 17A*

| Message | Definition |
|---|---|
| RECEIVE ACKNOWLEDGEMENT | requests that the client receive an acknowledgement regarding the server's current state |
| RECEIVE NEGATIVE ACKNOWLEDGEMENT WITH OPTIONAL ERROR CODES | requests that the client should prepare to receive a negative acknowledgement with information pertaining to an error that the server has recently encountered |
| RECEIVE SCENE MANIFEST WITH SERVER ASSIGNED ID AND URI | requests that the client be prepared to receive a manifest of scenes graphs associated with an identifier assigned by the server, and a URI. |
| RECEIVE MANIFEST CONTROL | requests that the client be prepared to receive the a manifest containing scene graph and other information about the presentation |
| RECEIVE MANIFEST SCRIPT N | requests that the client be prepared to receive a particular script associated with the scene graph |
| END SCRIPT N | notifies the client that server does not intend or has no more information to send for the particular script |
| RECEIVE SHADER N | requests that the client be prepared to receive a particular shader associated with the scene graph |
| END SHADER N | notifies the client that server does not intend or has no more information to send for the particular shader |

FIG. 17B

| Message | Definition |
|---|---|
| RECEIVE COMPONENT CONTROL WITH ASSETS OF TYPE | requests that the client be prepared to receive control information about a particular component associated with the scene graph |
| END COMPONENT | notifies the client that server does not intend or has no more information to send for the particular component |
| END MANIFEST | notifies the client that server does not intend or has no more information to send for the particular manifest |
| RECEIVE STATIC TEXTURE ASSET WITH SERVER ASSIGNED ID AND URI | requests that the client be prepared to receive a particular static texture asset with an identifier assigned by the server, and a URI |
| RECEIVE STATIC TEXTURE ASSET CONTROL | requests that the client be prepared to receive control information about a particular static texture asset |
| RECEIVE TEXTURE BASE LAYER | requests that the client be prepared to receive base layer information for a particular static texture asset |
| RECEIVE TEXTURE ENHANCEMENT LAYER #N | requests that the client be prepared to receive enhancement layer information for a particular static texture asset |
| END TEXTURE ASSET | notifies the client that server does not intend or has no more information to send for the particular texture asset |
| RECEIVE POINT CLOUD ASSET WITH SERVER ASSIGNED ID AND URI | requests that the client be prepared to receive a particular point cloud asset with an identifier assigned by the server, and a URI |

FIG. 17C

| Message | Definition |
|---|---|
| RECEIVE POINT CLOUD ASSET CONTROL | requests that the client be prepared to receive control information about a particular point cloud asset |
| RECEIVE POINT CLOUD BASE LAYER | requests that the client be prepared to receive base layer information for a particular point cloud asset |
| RECEIVE POINT CLOUD ENHANCEMENT LAYER #N | requests that the client be prepared to receive enhancement layer information for a particular point cloud asset |
| END POINT CLOUD ASSET | notifies the client that server does not intend or has no more information to send for the particular point cloud asset |
| RECEIVE MESH ASSET WITH SERVER ASSIGNED ID AND URI | requests that the client be prepared to receive a particular mesh asset with an identifier assigned by the server, and a URI |
| RECEIVE MESH CONTROL | requests that the client be prepared to receive control information about a particular mesh asset |
| RECEIVE MESH BASE LAYER | requests that the client be prepared to receive base layer information for a particular mesh asset |
| RECEIVE MESH ENHANCEMENT LAYER #N | requests that the client be prepared to receive enhancement layer information for a particular mesh asset |
| END MESH ASSET | notifies the client that server does not intend or has no more information to send for the particular mesh asset |

FIG. 17D

| Message | Definition |
|---|---|
| RECEIVE HAPTIC ASSET WITH SERVER ASSIGNED ID AND URI | requests that the client be prepared to receive a particular haptic asset with an identifier assigned by the server, and a URI |
| RECEIVE HAPTIC CONTROL | requests that the client be prepared to receive control information about a particular haptic asset |
| RECEIVE HAPTIC BASE LAYER | requests that the client be prepared to receive base layer information for a particular haptic asset |
| RECEIVE HAPTIC ENHANCEMENT LAYER #N | requests that the client be prepared to receive enhancement layer information for a particular mesh asset |
| END HAPTIC ASSET | notifies the client that server does not intend or has no more information to send for the particular haptic asset |
| RECEIVE VIDEO ASSET WITH SERVER ASSIGNED ID AND URI | requests that the client be prepared to receive a particular video asset with an identifier assigned by the server, and a URI |
| RECEIVE VIDEO HIGH LEVEL CONTROL | requests that the client be prepared to receive high level control information for a particular video asset |
| RECEIVE GOP LEVEL CONTROL | requests that the client be prepared to receive GOP control information for a particular video asset |
| RECEIVE TILE LEVEL CONTROL | requests that the client be prepared to receive tile control information for a particular video asset |

*FIG. 17E*

| Message | Definition |
|---|---|
| RECEIVE FRAME LEVEL CONTROL | requests that the client be prepared to receive frame control information for a particular video asset |
| RECEIVE VIDEO ASSET BASE LAYER | requests that the client be prepared to receive base layer information for a particular video asset |
| RECEIVE VIDEO ASSET ENHANCEMENT LAYER | requests that the client be prepared to receive enhancement layer information for a particular video asset |
| END VIDEO ASSET | notifies the client that server does not intend or has no more information to send for the particular video asset |
| RECEIVE NEURAL NETWORK MODEL WITH SERVER ASSIGNED ID AND URI | requests that the client be prepared to receive a particular neural network model with an identifier assigned by the server, and a URI |
| RECEIVE NEURAL NETWORK MODEL CONTROL | requests that the client be prepared to receive control information for a particular neural network model |
| RECEIVE NEURAL NETWORK MODEL LAYER N | requests that the client be prepared to receive a particular layer for a particular neural network model. |
| END NEURAL NETWORK | notifies the client that server does not intend or has no more information to send for the particular neural network model. |
| ASSIGN SERVER ASSIGNED ID TO ASSET URI | requests that the client associate a particular server assigned ID to an asset with a particular URI that is known to be a cached resource available to the client |

FIG. 17F

| Message | Definition |
|---|---|
| FETCH ASSET URI FROM LOCATION XXX.XXX.XXX.XXX ON NETWORK | requests that the client fetch a particular server asset with a particular URI that is known to be a cached resource available to the client at a location on the network. |
| CLEAR MUTABLE CACHED ASSETS | requests that the client clear its mutable asset cache. This same request also clears all client mappings of server assigned identifiers to assets that had been cached in the mutable cache. |

FIG. 17G

| Message | Definition |
|---|---|
| RECEIVE ACKNOWLEDGMENT | requests that the server receive an acknowledgement regarding the client's current state |
| RECEIVE NEGATIVE ACKNOWLEDGMENT WITH OPTIONAL ERROR CODES | requests that the server should prepare to receive a negative acknowledgement with information pertaining to an error that the client has recently encountered |
| RECEIVE NEURAL NETWORK MODEL WITH CLIENT ASSIGNED ID AND URI | requests that the server should prepare to receive a neural network model with an identifier assigned by the client assigned and a URI. |
| RECEIVE NEURAL NETWORK MODEL CONTROL | requests that the server be prepared to receive control information for a particular neural network model |
| RECEIVE NEURAL NETWORK MODEL LAYER N | requests that the server be prepared to receive a particular layer for a particular neural network model. |
| END NEURAL NETWORK | notifies the server that the client does not intend or has no more information to send for the particular neural network model. |
| REQUEST SCENE MANIFEST WITH URI | requests that the server send a particular scene manifest for a particular presentation |
| RECEIVE CLIENT CHARACTERISTICS | requests that the server receive the client characteristics information. |
| REQUEST VIDEO ASSET WITH URI | requests that the server send a particular asset with a particular URI |
| REQUEST POINT CLOUD ASSET WITH URI | requests that the server send a particular point cloud asset with a particular URI |
| REQUEST MESH ASSET WITH URI | requests that the server send a particular mesh asset with a particular URI |
| REQUEST HAPTIC ASSET WITH URI | requests that the server send a particular haptic asset with a particular URI |
| RECEIVE CURRENT RESOURCE STATE | requests that the server receive state information about a particular asset. |
| RECEIVE CURRENT ASSETS LIST | requests that the server receive state information about the list of assets stored within the clients mutable assets storage |

*FIG. 18*

Commands/Messages in 1902:
Request Type and Model
Request Client Characteristics
Request Neural Network Model
Request Currently Cached Asset URIs and Types
Request Asset State for Asset URI
Request Acknowledgement
Receive Acknowledgement
Receive Negative Acknowledgement with optional error codes
Receive Scene Manifest with server assigned ID and URI
Receive Manifest Control
End Script N
End Shader N
Receive Component Control with Assets and Type End Component
End Manifest
Receive Static Texture Asset with Server Assigned ID and URI
Receive Static Texture Asset Control Information
End Texture Asset
Receive Point Cloud Asset with Server Assigned ID and URI
Receive Point Cloud Asset Control Information
End Point Cloud Asset
Receive Mesh Asset with Server Assigned ID and URI
Receive Mesh Control Information
End Mesh Asset
Receive Haptic Asset with Server Assigned ID and URI
Receive Haptic Control Information
End Haptic Asset
Receive Video Asset with Server Assigned IF and URI
Receive High Level Control Information
Receive GOP Level Control Information
Receive Tile Level Control Information
Receive Frame Level Control Information
Enf Video Asset
Receive Neural Network Model with Server Assigned ID and URI
Receive Neural Network Model Control Information
End Neural Network
Assign Server Assogned ID to Asset URI
Fetch Asset URI from Location xxx.xxx.xxx.xxx on Network
Clear Cached Assets

FIG. 19B

Commands/Messages in 1903
Receive Acknowledgement
Receive Negative Acknowledgement with optional error codes
Receive Neural Network Model Control Information
End Neural Network
Request Scene Manifest with URI
Receive Client Characteristics
Request Video Asset with URI
Request Point Cloud Asset with URI
Request Mesh Asset with URI
Request Haptic Asset with URI
Receive Current Resource State
Receive Current Assets

*FIG. 19C*

Commands/Messages in 1904
Receive Manifest Script N
Receive Shader N
Receive Texture Base Layer
Receive Texture Enhandement Layer N
Receive Point Cloud Base Layer
Receive Point Cloud Enhancement Layer N
Receive zmesh Base Layer
Receive Mesh Enhancement Layer N
Receive Haptic Base Layer
Receive Haptic Enhancement Layer N
Receive Video Asset Base Layer
Receive Video Asset Enhancement Layer
Receive Neural Network Model Layer N

*FIG. 19D*

Commands/Messages in 1905
Receive Neural Network Model Layer N

*FIG. 19E*

BIDIRECTIONAL PRESENTATION DATASTREAM USING CONTROL AND DATA PLANE CHANNELS

INCORPORATION BY REFERENCE

This present disclosure claims the benefit of priority to U.S. Provisional Application No. 63/217,049, "INTELLIGENT BIDIRECTIONAL PRESENTATION DATASTREAM USING CONTROL AND DATA PLANE CHANNELS" filed on Jun. 30, 2021, which is incorporated by reference herein in its entirety.

TECHNICAL FIELD

The present disclosure describes embodiments generally related to media processing and distribution.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Immersive media generally refers to media that stimulates any or all human sensory systems (visual, auditory, somatosensory, olfactory, and possibly gustatory) to create or enhance the perception of the user being physically present in the experience of the media, such as beyond what is distributed over existing commercial networks for timed two-dimensional (2D) video and corresponding audio which is known as "legacy media". Both immersive media and legacy media can be characterized as either timed or untimed.

Timed media refers to media that is structured and presented according to time. Examples include movie features, news reports, episodic content, all of which are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with abilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. In contrast, legacy devices such as laptop displays, televisions, and mobile handset displays are homogenous in their capabilities since all of these devices are comprised of rectangular display screens, and consume 2D rectangular video or still images as their primary media formats.

SUMMARY

Aspects of the disclosure provide methods and apparatuses for media processing. In some examples, an apparatus includes processing circuitry. The processing circuitry can exchange, with a server device, a plurality of control messages over a control plane channel that uses a first transport protocol. The plurality of control messages belongs to a control plane of a bidirectional protocol for immersive media distribution. The processing circuitry receives, from the server device, a first plurality of data messages over a first data plane channel that uses a second transport protocol. The first plurality of data messages belongs to a data plane of the bidirectional protocol and carries immersive media content. The processing circuitry presents the immersive media content carried by the first plurality of data messages.

In some examples, the first transport protocol is transmission control protocol (TCP) and the second transport protocol is user datagram protocol (UDP).

In some examples, the first transport protocol is a connection-based transport protocol, and the second transport protocol is a connectionless transport protocol.

In some embodiments, the processing circuitry sets up the first data plane channel with the server device according to the plurality of control messages exchanged over the control plane channel.

In some examples, the processing circuitry provides one or more specific characteristics of the apparatus to the server device over the control plane channel. The one or more specific characteristics includes at least one of a computing resource of the apparatus, a storage resource of the apparatus, a service level agreement of a network service provider at the apparatus, an immersive application requirement, a type of the apparatus, a model of the apparatus, and a neural network model at the apparatus.

In some examples, the processing circuitry transmits, to the server device, a second plurality of data messages over a second data plane channel that uses the second transport protocol. The second plurality of data messages carries at least one of layer information of a neural network model at the apparatus, and rendered media content by the apparatus.

In some embodiments, the apparatus is a first client device, and the plurality of control messages enables the server device to share the immersive media content with a second client device. In an example, the processing circuitry provides, in response to a request from the server device, a list of types of assets that are sharable and uniform resource identifiers (URIs) for the assets that are cached in an immutable storage via the control plane channel. In another example, the processing circuitry provides in response to a request from the server device, a status update of each asset that is accessible by the first client device via the control plane channel. In another example, the processing circuitry provides, in response to a request from the server device, a current state of a particular asset type and one of a particular server assigned identifier and a particular asset uniform resource identifier (URI) via the control plane channel.

Aspects of the disclosure also provide a non-transitory computer-readable medium storing instructions which when executed by a computer cause the computer to perform the method for media processing.

BRIEF DESCRIPTION OF THE DRAWINGS

Further features, the nature, and various advantages of the disclosed subject matter will be more apparent from the following detailed description and the accompanying drawings in which:

FIGS. 16A-16B show messages that are sent from a server side to a client side using a bidirectional protocol for immersive media distribution in some examples.

FIG. 16C shows messages that are sent from a client side to a server side using a bidirectional protocol for immersive media distribution in some examples.

FIGS. 17A-17G show definitions of messages sent from the server side to the client side in some examples.

FIG. 18 shows definitions of messages sent from the client side to the server side in some examples.

FIGS. 19A-19E show diagrams of bidirectional presentation datastream over separate control plane channels and data plane channels.

DETAILED DESCRIPTION OF EMBODIMENTS

Figure 1:
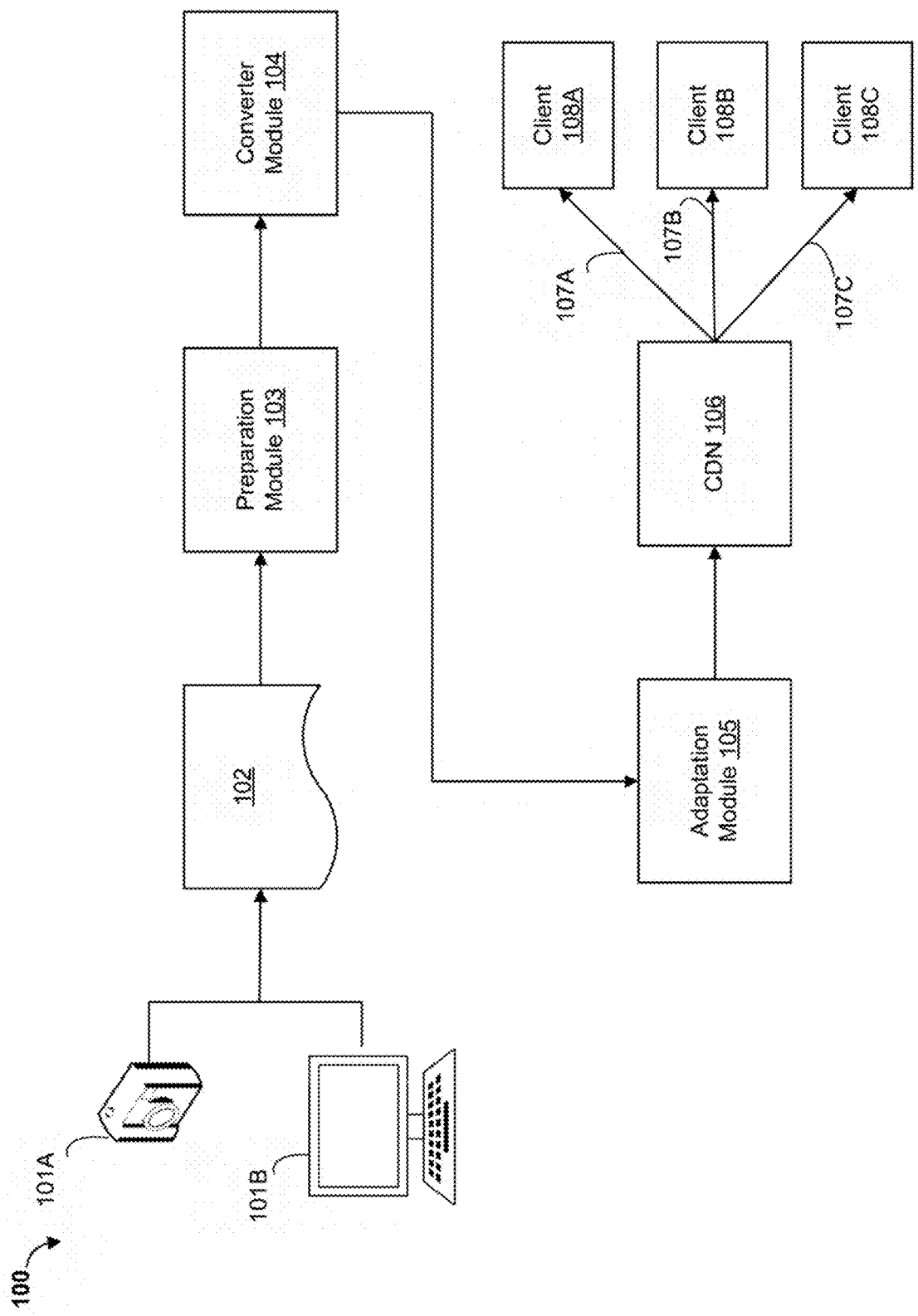
FIG. 1 is a diagram of an end-to-end process of timed media distribution in an example.

Aspects of the disclosure provide techniques for bidirectional presentation datastream over separate data plane channels and control plane channels. The present disclosure describes embodiments generally related to architectures, structures and components for systems and networks that distribute media, including video, audio, geometric (3D) objects, haptics, associated metadata, or other content for a client presentation device. Some embodiments are directed to systems, structures, and architectures for distribution of media content to heterogenous immersive and interactive client presentation devices.

Immersive media generally refers to media that stimulates any or all human sensory systems (visual, auditory, somatosensory, olfactory, and possibly gustatory) to create or enhance the perception of the user being physically present in the experience of the media, i.e., beyond what is distributed over existing commercial networks for timed two-dimensional (2D) video and corresponding audio which is known as "legacy media". Both immersive media and legacy media can be characterized as either timed or untimed.

Timed media refers to media that is structured and presented according to time. Examples include movie features, news reports, episodic content, all of which are organized according to periods of time. Legacy video and audio are generally considered to be timed media.

Untimed media is media that is not structured by time; but rather structured by logical, spatial, and/or temporal relationships. An example includes a video game where the user has control over the experience created by the gaming device. Another example of untimed media is a still image photograph taken by a camera. Untimed media may incorporate timed media, for example, in a continuously looped audio or video segment of a scene for a video game. Conversely, timed media may incorporate untimed media, for example a video with a fixed still image as background.

Immersive media-capable devices may refer to devices equipped with abilities to access, interpret, and present immersive media. Such media and devices are heterogeneous in terms of the quantity and formats of the media, and numbers and types of network resources required to distribute such media at scale, i.e., to achieve distribution equivalent to that of legacy video and audio media over networks. In contrast, legacy devices such as laptop displays, televisions, and mobile handset displays are homogenous in their capabilities since all of these devices are comprised of rectangular display screens, and consume 2D rectangular video or still images as their primary media formats. Likewise, the number of audio formats supported in legacy devices is limited to a relatively small set.

The distribution of any media over networks may employ media delivery systems and architectures that reformat the media from an input or network ingest format to a final distribution format where that distribution format is not only suitable for the targeted client device and its applications, but is also conducive to being streamed over the network. Streaming of media broadly refers to the fragmenting and packetizing of the source media so that the media can be delivered over the network in consecutive smaller-sized "chunks" logical organized and sequenced according to either or both the media's temporal or spatial structure. In such distribution architectures and systems, the media may undergo compression or layering processes so that only the most salient media information is delivered first to the client. In some cases, the client receives all of the salient media information for some portion of the media before the client is able to present any of the same media portion to the end user.

The process of reformatting an input media to match the capabilities of a target client end-point may employ a neural network process that takes a network model that may encapsulate some prior knowledge of the specific media being reformatted. For example, a specific model may be tuned to recognize outdoor park scenes (with trees, plants, grass, and other objects common to a park scene), whereas yet a different specific model may be tuned to recognize an indoor dinner scene (with a dinner table, serving utensils, persons seated at the table, and so on). In some examples, a network model can be tuned to recognize objects from a particular context, e.g., park scene objects, and a neural network process equipped with a network model that is tuned to match the contents of a specific scene can produce better visual results than a network model that is not so tuned. Hence, there is a benefit of providing scene-specific network models to a neural network process that is tasked with reformatting the input media to match the capabilities of a target client end-point.

The mechanism to associate a neural network model to a specific scene for two dimensional (2D) media may be accomplished by, for example, compressing the network model and inserting the compressed network model directly into the 2D coded bitstream for a visual scene by means of a supplemental enhancement information (SEI) structured field commonly used to attach metadata to coded video streams, for example, in H.264, H.265, and H.266 video compression formats. The presence of an SEI message containing a specific neural network model within the context of a portion of a coded video bitstream may be used to indicate that the network model is to be used to interpret and adapt the video contents within the portion of the bitstream in which the model is embedded. In some examples, the SEI message may be used to signal, by means of an identifier for a network model, which neural network model(s) may be used in the absence of the actual model itself.

The mechanism to associate an appropriate neural network for immersive media may be accomplished by the immersive media itself referencing the appropriate neural network model to use. This reference may be accomplished by directly embedding the network model and its parameters on an object by object basis, or scene by scene basis, or by some combination thereof. In some examples, rather than embedding the one or more neural network models within the media, the media objects or scenes may reference the particular neural network models by identifiers.

In some other examples, a mechanism to reference an appropriate neural network for adaptation of media for streaming to a client end-point is for the specific client end-point itself to provide at least one neural network model, and corresponding parameters, to the adaptation process to use. Such a mechanism may be implemented by way of the client providing the neural network model(s) in a communication with the adaptation process, for example, when the client attaches itself to the network.

Following the adaptation of the video to the target client end-point, an adaptation process within the network may then choose to apply a compression algorithm to the result. In addition, the compression algorithm may, in some examples, separate the adapted video signal into layers that correspond to the most salient to the least salient portions of the visual signal.

In some examples, a compression and layering process, such as the progressive format of the JPEG standard (ISO/IEC 10918 Part 1), can separate the image into layers that cause the entire image to be presented first with only basic shapes and colors that are initially out of focus, i.e. from the lower-order DCT coefficients for the entire image scan, followed by additional layers of detail that cause the image to come into focus, i.e. from the higher-order DCT coefficients of the image scan.

The process of breaking media into smaller portions, organizing them into the payload portions of consecutive network protocol packets, and distributing these protocol packets is referred to as streaming of the media whereas the process of converting the media into a format that is suitable for presentation on one of a variety of heterogenous client end-points that is operating one of a variety of heterogenous applications is referred to as adapting the media.

The definitions of the some terms used in the present disclosure are provided in the following paragraphs.

Scene graph: general data structure commonly used by vector-based graphics editing applications and modern computer games, which arranges the logical and often (but not necessarily) spatial representation of a graphical scene; a collection of nodes and vertices in a graph structure.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Container: a serialized format to store and exchange information to represent all natural, all synthetic, or a mixture of synthetic and natural scenes including a scene graph and all of the media resources that are required for rendering of the scene.

Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g., repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include: Unity, Unreal.

Evaluate: produces a result (e.g., similar to evaluation of a document object model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, IK, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path tracing: a computer graphics method of rendering three-dimensional scenes such that the illumination of the scene is faithful to reality.

Timed media: media that is ordered by time; e.g., with a start and end time according to a particular clock.

Untimed media: media that is organized by spatial, logical, or temporal relationships; e.g., as in an interactive experience that is realized according to the actions taken by the user(s).

Neural network model: a collection of parameters and tensors (e.g., matrices) that define weights (i.e., numerical values) used in well defined mathematical operations applied to the visual signal to arrive at an improved visual output which may include the interpolation of new views for the visual signal that were not explicitly provided by the original signal.

According to some aspects of the disclosure, immersive media can be regarded as one or more types of media that, when presented to a human by an immersive media-capable device, stimulates any of the five senses of sight, sound, taste, touch, and hearing, in a way that is more realistic and consistent with a human's understanding of experiences within the natural world, i.e.; stimulation beyond that which would have otherwise been achieved with legacy media presented by legacy devices. In this context, the term legacy media refers to two-dimensional (2D) visual media, either still or moving picture frames, and/or corresponding audio for which the user's ability to interact is limited to pause, play, fast-forward, or rewind; legacy devices may refer to televisions, laptops, displays, and mobile devices that are constrained in their capabilities to the presentation of only legacy media.

In some consumer-facing application scenarios, the presentation device for the immersive media (i.e., an immersive media-capable device) is a consumer-facing hardware device that is especially equipped with the capabilities to leverage specific information that is embodied by the immersive media such that the device can create a presentation that more closely approximates the human's understanding of, and interaction with, the physical world, i.e., beyond the capabilities of a legacy device to do so. Legacy devices are constrained in their abilities to present only legacy media, whereas immersive media devices are not likewise constrained.

In the last decade, a number of immersive media-capable devices have been introduced into the consumer market, including head-mounted displays, augmented-reality glasses, hand-held controllers, haptic gloves, and game consoles. Likewise, holographic displays and other forms of volumetric displays are poised to emerge within the next decade. Despite the immediate or imminent availability of these devices, a coherent end-to-end ecosystem for the distribution of immersive media over commercial networks has failed to materialize for several reasons.

One of those reasons is the lack of a single standard representation for immersive media that can address the two major use cases relative to the current distribution of media at scale, over commercial networks: 1) real-time distribution for live action events, i.e., where the content is created and distributed to the client end-point in or near real-time, and 2) non-real-time distribution, where there is no requirement to distribute the content in real-time, i.e., as the content is being physically captured or created. Respectively, these two use cases may be comparably compared to broadcast and on-demand formats of distribution as they exist today.

For real-time distribution, the content can be captured by one or more camera(s), or created using computer generation techniques. In some examples, content that is captured by camera(s) is herein referred to as natural content, whereas content that is created using computer generation techniques is herein referred to as synthetic content. The media formats to represent synthetic content can be formats used by the 3D modelling, visual effects, and CAD/CAM industries and can include object formats and tools such as meshes, textures, point clouds, structured volumes, amorphous volumes (e.g., for fire, smoke, and fog), shaders, procedurally generated geometry, materials, lighting, virtual camera definitions, and animations. While synthetic content is computer generated, synthetic media formats can be used for both natural and synthetic content, however, the process to convert natural content into synthetic media formats (e.g., into synthetic representations) can be a time and compute intensive process, and therefore may be impractical for real-time applications and use cases.

For real-time distribution of natural content, camera-captured content can be distributed in a raster format, which is suitable for legacy display devices because many of such devices are likewise designed to display raster formats. That is, given that legacy displays are designed homogenously to display raster formats, the distribution of raster formats is therefore optimally suitable for displays that are capable of displaying only raster formats.

Immersive media-capable displays, however, are not necessarily constrained to the display of raster-based formats. Moreover, some immersive-media capable displays are unable to present media that is available only in raster-based formats. The availability of displays that are optimized to create immersive experiences based on formats other than raster-based formats is another significant reason why there is not yet a coherent end-to-end ecosystem for the distribution of immersive media.

Yet another problem with creating a coherent distribution system for multiple different immersive media devices is that the current and emerging immersive media-capable devices themselves can vary significantly. For example, some immersive media devices are explicitly designed to be used by only one user at a time, e.g., head-mounted displays. Some other immersive media devices are designed so that they can be used by more than one user simultaneously, e.g., the "looking glass factory 8K display" (henceforth called "lenticular light field display") can display content that can be viewed by up to 12 users simultaneously, where each user is experiencing his or her own unique perspective (i.e., view) of the content that is being displayed.

Further complicating the development of a coherent distribution system is that the number of unique views that each display is capable of producing can vary greatly. In most cases, legacy displays can create only a single view of the content. Whereas, the lenticular light field display can support multiple users with each user experiencing unique views of the same visual scene. To accomplish this creation of multiple views of the same scene, the lenticular light field display creates a specific volumetric viewing frustum in which 45 unique views of the same scene are required as input to the display. This means that 45 slightly different unique raster representations of the same scene need to be captured and distributed to the display in a format that is specific to this one particular display, i.e., its viewing frustum. In contrast, the viewing frustum of legacy displays is limited to a single two-dimensional plane, and hence there is no way to present more than one viewing perspective of the content via the display's viewing frustum regardless of the number of simultaneous viewers that are experiencing the display.

In general, immersive media displays can vary significantly according to these following characteristics of all displays: the dimensions and volume of the viewing frustum, the number of viewers supported simultaneously, the optical technology used to fill the viewing frustum which can be point-based, ray-based, or wave-based technologies, the density of the units-of-light (either points, rays, or waves) that occupy the viewing frustum, the availability of compute power and type of compute (CPU or GPU), the source and availability of power (battery or wire), the amount of local storage or cache, and access to auxiliary resources such as cloud based compute and storage. These characteristics contribute to the heterogeneity of immersive media displays, which in contrast to the homogeneity of legacy displays, complicates the development of a single distribution system that can support all of them, including both legacy and immersive types of displays.

The disclosed subject matter addresses the development of a network-based media distribution system that can support both legacy and immersive media displays as client-end points within the context of a single network. Specifically, a mechanism to adapt an input immersive media source into a format that is suitable to the specific characteristics of a client end-point device, including the application that is currently executing on that client end-point device, is presented herein. Such a mechanism of adapting an input immersive media source includes reconciling the characteristics of the input immersive media with the characteristics of the target end-point client device, including the application that is executing on the client device, and then adapting the input immersive media into a format suitable for the target end point and its application. Moreover, the adaptation process may include interpolating additional views, e.g., novel views, from the input media to create additional views that are required by the client end-point. Such interpolation may be performed with the aid of a neural network process.

Note that the remainder of the disclosed subject matter assumes, without loss of generality, that the process of adapting an input immersive media source to a specific end-point client device is the same as, or similar to, the process of adapting the same input immersive media source to the specific application that is being executed on the specific client end-point device. That is, the problem of adapting an input media source to the characteristics of an end-point device are of the same complexity as the problem to adapt a specific input media source to the characteristics of a specific application.

Legacy devices, supported by legacy media, have achieved wide-scale consumer adoption because they are likewise supported by an ecosystem of legacy media content providers that produce standards-based representations of legacy media, and commercial network service providers that provide network infrastructure to connect legacy devices to sources of standard legacy content. Beyond the role of distributing legacy media over networks, commercial network service providers may also facilitate the pairing of legacy client devices with access to legacy content on content distribution networks (CDNs). Once paired with access to suitable forms of content, the legacy client device can then request, or pull, the legacy content from the content server to the device for presentation to the end user. Nevertheless, an architecture where the network server pushes the appropriate media to the appropriate client is equally relevant without incurring additional complexity to the overall architecture and solution design.

According to some aspects of the disclosure, a media distribution network supporting heterogeneous clients can leverage the fact that some of the assets that are adapted from an input media format to a specific target format may be reused across a set of similar display targets (client devices). For example, some assets, once converted to a format suitable for a target display may be reused across a number of such displays that have similar adaptation requirements. In some examples, the media distribution network can employ a caching mechanism to store adapted assets into a storage that is relatively immutable.

According to an aspect of the disclosure, immersive media may be organized into "scenes" that are described by scene graphs, which are also known as scene descriptions. The scope of a scene graph is to describe visual, audio, and other forms of immersive assets that comprise a particular setting that is part of a presentation, for example, the actors and events taking place in a particular location in a building that is part of a presentation, e.g., movie. A list of all scenes that comprise a single presentation may be formulated into a manifest of scenes.

In some examples, for content that is prepared in advance of having to distribute such content, a "bill of materials" can be created that identifies all of the assets that will be used for the entire presentation, and how often each asset is used across the various scenes within the presentation. A media distribution network can be implemented to have knowledge of the existence of cached resources that can be used to satisfy the asset requirements for a particular presentation.

Some aspects of the disclosure can provide a bidirectional protocol that can be used between a media distribution network (e.g., a server device in the media distribution network that interfaces the media distribution network with client devices) and client devices. In some examples, the bidirectional protocol can be used in a media distribution network that distributes immersive media. The bidirectional protocol can support a variety of diverse client devices that require asset types in various formats. In some examples, the bidirectional protocol can enable reuse of assets that have previously been adapted for use by a particular client device.

It is noted that in the present disclosure, without loss of generality, the process of adapting an input immersive media source to a specific end-point client device is the same as, or similar to, the process of adapting the same input immersive media source to the specific application that is being executed on the specific end-point client device. The techniques of adapting an input media source to the characteristics of an end-point device can be about the same as the techniques to adapt the input media source to the characteristics of a specific application.

According to an aspect of the disclosure, legacy devices, supported by legacy media, have achieved wide-scale consumer adoption because they are likewise supported by an ecosystem of legacy media content providers that produce standards-based representations of legacy media, and commercial network service providers that provide network infrastructure to connect legacy devices to sources of standard legacy content. Beyond the role of distributing legacy media over networks, commercial network service providers may also facilitate the pairing of legacy client devices with access to legacy content on content distribution networks (CDNs). Once paired with access to suitable forms of content, the legacy client device can then request, or "pull," the legacy content from the content server to the device for presentation to the end user. Nevertheless, a media distribution network may utilize an architecture where the network server "pushes" the appropriate media to the appropriate client.

Some aspects of the disclosure provide a media distribution network that includes interfacing devices (also referred to as server devices) for interfacing the media distribution network with client devices. The server devices can employ a bidirectional communication protocol (also referred to as bidirectional protocol) for the communication with the client devices, and can facilitate the adaptation of media to match requirements originating from the uniqueness of the client devices, or from the application running on the client devices. The server devices can also use the bidirectional protocol to stream assets that are either newly adapted or previously adapted and cached, to a particular client device. In some examples, the server devices can use the bidirectional protocol to support the ability for the client devices to request specific assistance from the server devices, for example, to assist with rendering of an asset in preparation for the client device to present the asset.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments relate to architectures, structures and components for systems and networks that distribute media, including video, audio, geometric (3D) objects, haptics, associated metadata, or other content for a client device. Particular embodiments are directed systems, structures, and architectures for distribution of media content to heterogenous immersive and interactive client device.

FIG. 1 shows a diagram of the end-to-end process (100) of timed legacy media distribution. In FIG. 1, timed audio-visual content is either captured by a camera or microphone (101A) or generated by a computer (101B), creating a sequence (102) of 2D images and associated audio that are input to a preparation module (103). The output of the preparation module (103) is edited content (e.g., for post-production including language translations, subtitles, other editing functions), referred to as a master format that is ready to be converted to a standard Mezzanine format, e.g., for on-demand media, or as a standard contribution format, e.g., for live events, by a converter module (104). In an example, the media is ingested by the commercial network service provider and an adaptation module (105) packages the media into various bitrates, temporal resolution (frame rates) or spatial resolutions (frame sizes) that are packaged into a standard distribution format. The resulting adaptations are stored onto a content distribution network (CDN) (106) from which various clients (108A)-(108C) make pull-requests (107A)-(107C) to fetch and present the media to the end user. It is important to note that the master format may consist of a hybrid of media from both (101A) or (101B), and that the format of (101A) may be obtained in real-time, e.g., such as media that is obtained from a live sporting event. Furthermore, clients (108A)-(108C) are responsible for choosing the specific adaptations that are best suited for the client's configuration and/or for the current network conditions, but it is equally possible that the network server (not shown in FIG. 1) could determine and subsequently push the appropriate content to the clients (108A)-(108C).

Figure 2:
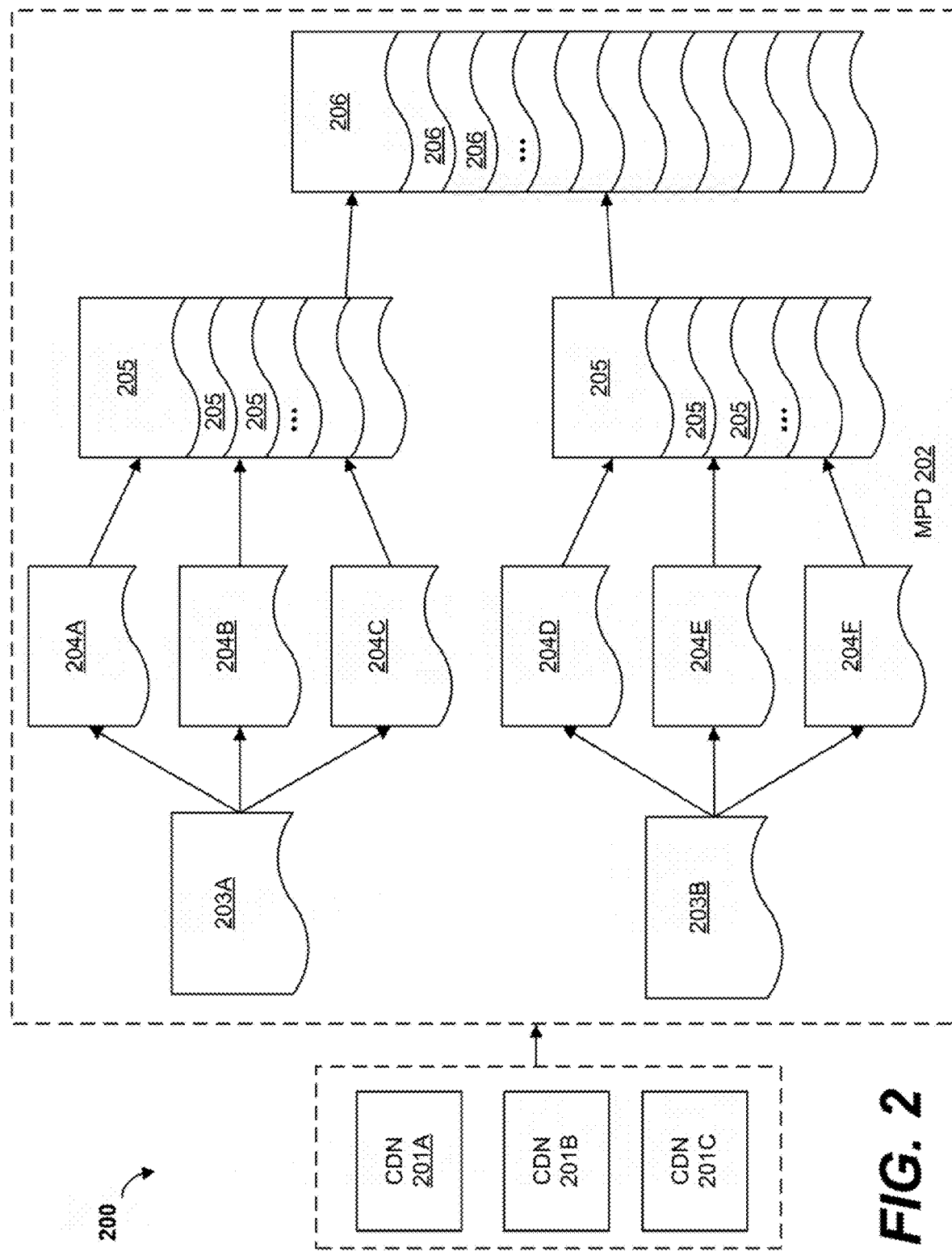
FIG. 2 is a diagram of a standard media format used for streaming of timed media in an example.

FIG. 2 shows a diagram of a standard media format (200) used for distribution of legacy timed media, e.g., video, audio, and supporting metadata (including timed text such as used for subtitles) in some examples. As noted by CDN (106) in FIG. 1, the media is stored in a standards-based distribution format onto CDNs, such as CDNs (201A)-(201C) in FIG. 2. The standards-based format is shown as MPD (202), which consists of multiple sections encompassing timed periods, such as time period (203A) and time period (203B) and the like, with a start and end time corresponding to a clock. In an example, each time period (e.g., (203A) (203B)) refers to one or more adaptation sets (204A)-(204F). Each adaptation set of (204A)-(204F) is generally used for a single type of media, e.g. video, audio, or timed text. In some examples, for any given time period (e.g., (203A)), multiple adaptation sets (e.g., (204A)-(204C)) may be provided, e.g., one for video, and multiple for audio such as used for translations into various languages. Each adaptation set of (204A)-(204F) refers to one or more representations (205) that provide information about the frame resolution (for video), frame rate, and bitrate of the media. Multiple representations (205) may be used to provide access to, for example, a representation (205) each for ultra-high-definition, high definition, or standard definition video. Each representation (205) refers to one or more segment files (206) where the media is actually stored for fetching by the client (as shown as (108A)-(108C) in FIG. 1) or for distribution (in a push-based architecture) by the network media server (not shown in FIG. 1).

Figure 3:
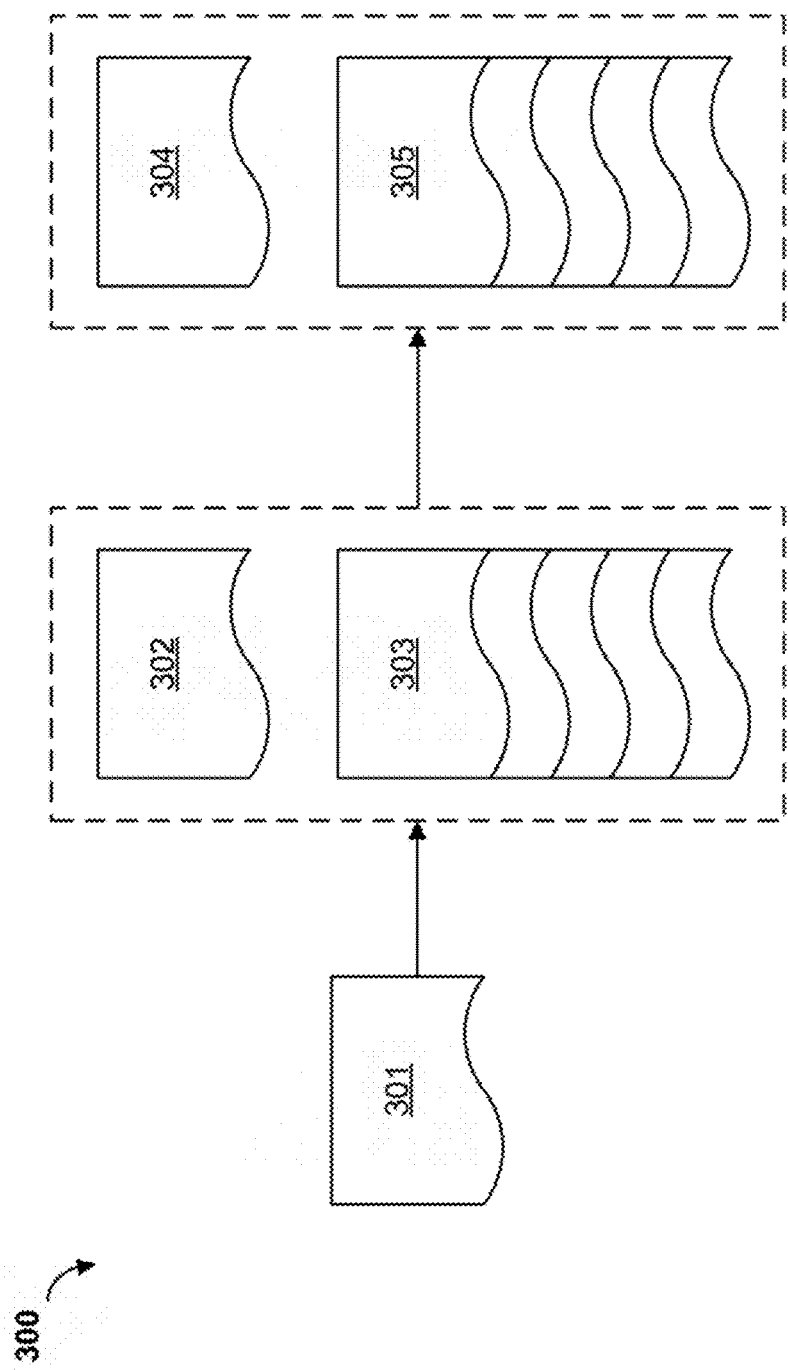
FIG. 3 is a diagram of a data-model for the representation and streaming of timed immersive media in some examples.
Figure 4:
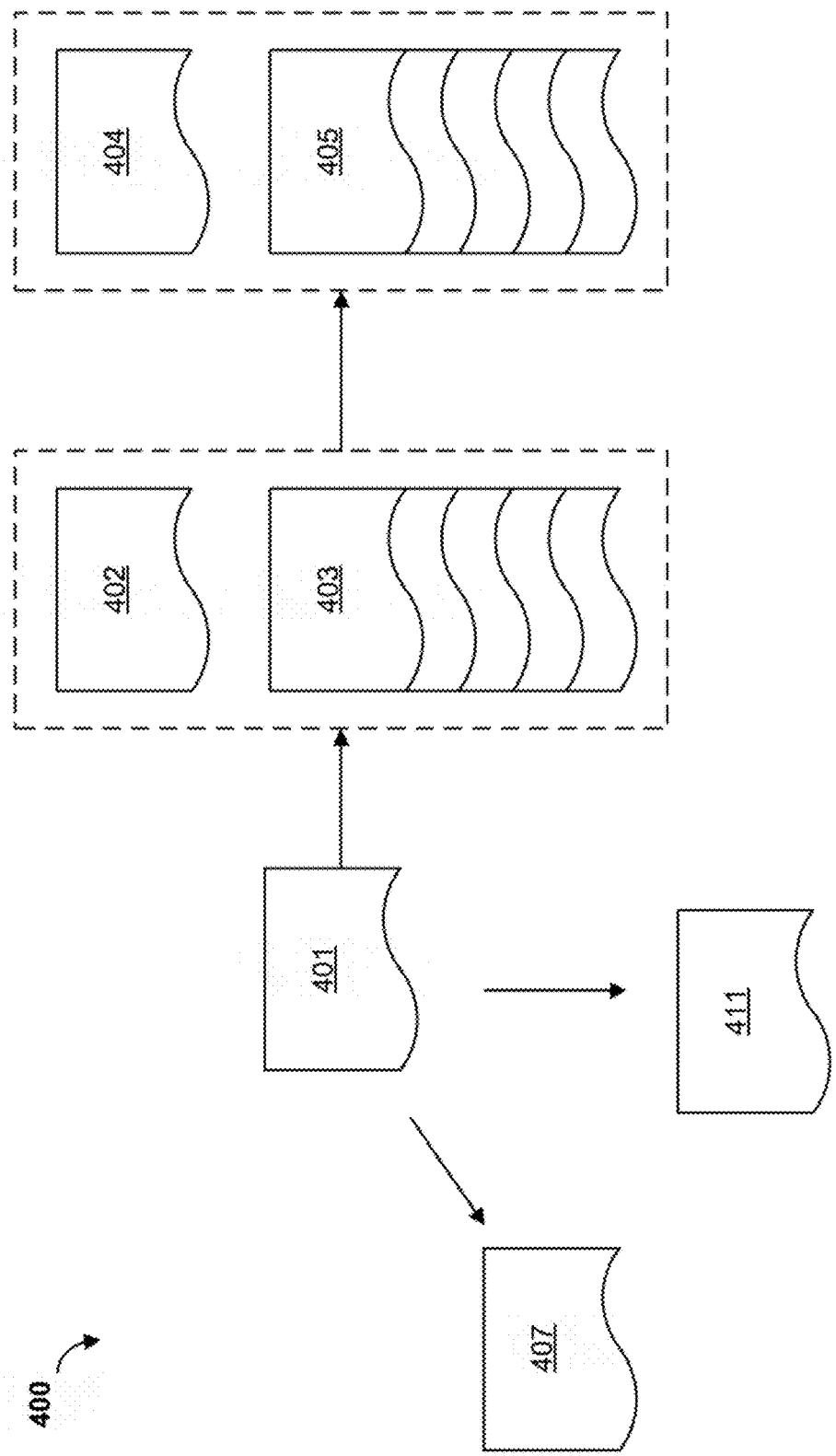
FIG. 4 is a diagram of a data-model for the representation and streaming of untimed immersive media in some examples.

FIG. 3 shows a representation of a streamable format (300) for heterogenous immersive media that is timed in an example; and FIG. 4 shows a representation of a streamable format (400) for heterogeneous immersive media that is untimed in an example. In the case of FIG. 3, FIG. 3 refers to a scene (301) for timed media. In the case of FIG. 4, FIG. 4 refers to a scene (401) for untimed media. For both cases, a scene may be embodied by various scene representations, or scene descriptions.

For example, in some immersive media designs, a scene may be embodied by a scene graph, or as a multi-plane image (MPI), or as a multi-spherical image (MSI). Both the MPI and MSI techniques are examples of technologies that aid in the creation of display-agnostic scene representations for natural content, i.e., images of the real world captured simultaneously from one or more cameras. Scene graph technologies, on the other hand, may be employed to represent both natural and computer-generated imagery in the form of synthetic representations, however, such representations are especially compute-intensive to create for the case when the content is captured as natural scenes by one or more cameras. That is, scene graph representations of naturally-captured content are both time and compute-intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are presently impractical to consider as candidates for representing natural content, because they cannot practically be created in real-time for consideration of use cases that require real-time distribution. In some examples, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally or by computer.

The following are example technologies that embody scene graphs as a format suitable for representing visual immersive media that is created using computer generated techniques, or naturally captured content for which deep learning or photogrammetry techniques are employed to create the corresponding synthetic representations of a natural scene, i.e., not essential for real-time distribution applications.

1. ORBX® by OTOY

ORBX by OTOY is one of several scene graph technologies that is able to support any type of visual media, timed or untimed, including ray-traceable, legacy (frame-based), volumetric, and other types of synthetic or vector-based visual formats. According to an aspect, ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for open shader language, a robust camera system, and support for Lua scripts. ORBX is also the basis of the immersive technologies media format published for license under royalty-free terms by the immersive digital experiences alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

2. Universal Scene Description by Pixar

Universal scene description (USD) by Pixar is another scene graph that can be used in the visual effects (VFX) and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 by Khronos glTF2.0 is the most recent version of the graphics language transmission format specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

It is noted that the above scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques, or they may be directly rendered from render engines based on specific virtual camera locations, filters, or descriptions of virtual cameras for these render engines.

The disclosed subject matter is therefore robust enough to consider that there is a relatively small but well known set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fiber optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as multi-access edge computing (MEC), software defined networks (SDN), and network functions virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client endpoints.

Immersive media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

The disclosed subject matter therefore enables a sufficiently equipped network, i.e., a network that employs some or all of the characteristics of a modern network, to simultaneously support a plurality of legacy and immersive media-capable devices according to features that are specified within that:

1. Provide flexibility to leverage media ingest formats that are practical for both real-time and on demand use cases for the distribution of media.

2. Provide flexibility to support both natural and computer generated content for both legacy and immersive-media capable client end-points.

3. Support both timed and untimed media.

4. Provide a process for dynamically adapting a source media ingest format to a suitable distribution format based on the features and capabilities of the client end-point, as well as based on the requirements of the application.

5. Ensure that the distribution format is streamable over IP-based networks.

6. Enable the network to simultaneously serve a plurality of heterogenous client end-points that may include both legacy and immersive media-capable devices.

7. Provide an exemplary media representation framework that facilitates the organization of the distribution media along scene boundaries.

An end-to-end embodiment of the improvements enabled by the disclosed subject matter is achieved according to the processing and components described the detailed description of FIG. 3 through FIG. 15.

FIG. 3 and FIG. 4 respectively employ an exemplary encompassing distribution format that can be adapted from an ingest source format to match the capabilities of a specific client end-point. As described above, the media that is shown in FIG. 3 is timed and the media that is shown in FIG. 4 is untimed. The specific encompassing format is robust enough in its structure to accommodate a large variety of media attributes that each may be layered based on the amount of salient information that each layer contributes to the presentation of the media. It is noted that the layering process can be applied in, for example progressive JPEG and scalable video architectures (e.g., specified in ISO/IEC 14496-10 Scalable Advanced Video Coding).

According to an aspect, the media that is streamed according to the encompassing media format is not limited to legacy visual and audio media, but may include any type of media information that is capable of producing a signal that interacts with machines to stimulate the human senses for sight, sound, taste, touch, and smell.

According to another aspect, the media that is streamed according to the encompassing media format can be both timed or untimed media, or a mixture of both.

According to another aspect, the encompassing media format is furthermore streamable by enabling a layered representation for media objects by use of a base layer and enhancement layer architecture. In one example, the separate base layer and enhancement layers are computed by application of multi-resolution or multi-tesselation analysis techniques for media objects in each scene. This is analogous to the progressively rendered image formats specified in ISO/IEC 10918-1 (JPEG), and ISO/IEC 15444-1 (JPEG2000), but not limited to raster-based visual formats. In an example, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

According to another aspect, the resolution of the attributes or refining information in the enhancement layers is not explicitly coupled with the resolution of the object in the base layer as it is today in existing MPEG video and JPEG image standards.

According to another aspect, the encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or adapt the media from its current format into a format that is suitable for the client end-point. In one example of such adaptation, the network would convert a volumetric visual media asset into a 2D representation of the same visual asset, by use of a Network-Based Media Processing protocol. In another example of such adaptation, the network may employ a neural network process to reformat the media to an appropriate format or optionally synthesize views that are needed by the client end-point.

According to another aspect, the manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.

According to another aspect, each layer of the media objects that are referenced within a scene is associated with a token (e.g., URI) that points to the address of where the resource can be accessed within the network. Such resources are analogous to CDN's where the content may be fetched by the client.

According to another aspect, the token for a representation of a geometric object may point to a location within the network or to a location within the client. That is, the client may signal to the network that its resources are available to the network for network-based media processing.

FIG. 3 describes an embodiment of the encompassing media format for timed media in some examples. In some examples, the timed scene manifest includes a scene (also referred to as scene information) (301). The scene (301) refers to a list of components (302) that separately describe processing information and types of media assets that comprise scene (301). Components (302) refer to assets (303) that further refer to base layers (304) and attribute enhancement layers (305).

FIG. 4 describes an embodiment of the encompassing media format for untimed media in some examples. The untimed scene manifest includes a scene (401). The scene (also referred to as scene information) (401) is not associated with a start and end duration according to a clock. The scene (401) refers to a list of components (402) that separately describe processing information and types of media assets that comprise the scene (401). Components (402) refer to assets (403) (e.g., visual, audio, and haptic assets) that further refer to base layers (404) and attribute enhancement layers (405). Furthermore, the scene (401) refers to other scenes (411) that are for untimed media. The scene (401) may also refer to a timed media scene (407), in some examples.

Figure 5:
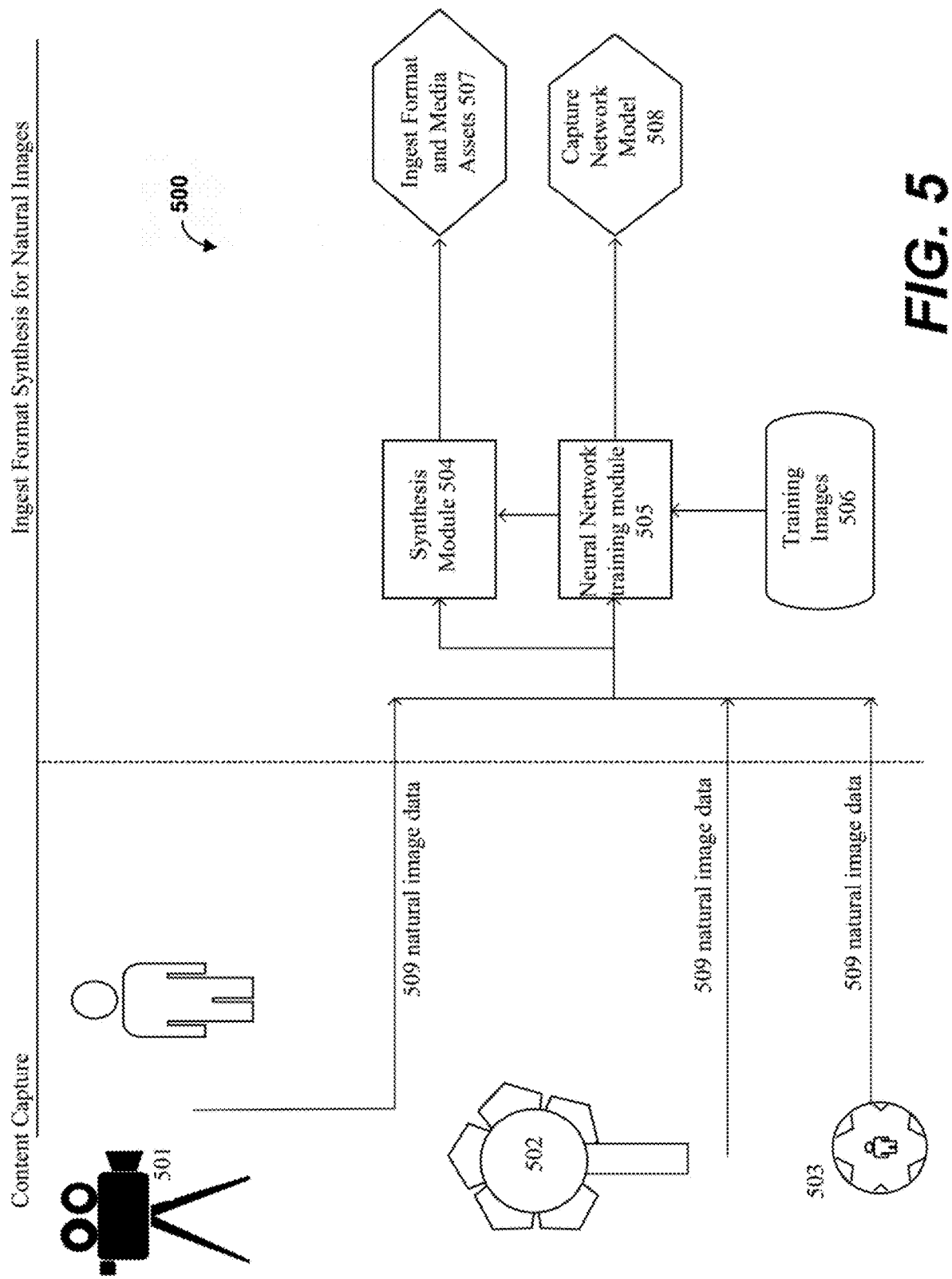
FIG. 5 is a diagram of a process of capturing a natural scene and converting to a representation that can be used as an ingest format for a network that serves heterogenous client end-points in some examples.

FIG. 5 shows a diagram of process (500) to synthesize an ingest format from natural content. The process (500) includes a first sub-process for content capture and a second sub-process of ingest format synthesis for natural images.

In the FIG. 5 example, in the first sub-process, camera unit can be used to capture natural image content (509). For example, camera unit (501) can use a single camera lens to capture a scene of a person. Camera unit (502) can capture a scene with five diverging fields of view by mounting five camera lenses around a ring-shaped object. The arrangement in (502) is an exemplary arrangement for capturing omni-directional content for VR applications. Camera unit (503) captures a scene with seven converging fields of view by mounting seven camera lenses on the inner diameter portion of a sphere. The arrangement in (503) is an exemplary arrangement for capturing light fields for light field or holographic immersive displays.

In the FIG. 5 example, in the second sub-process, the natural image content (509) is synthesized. For example, the natural image content (509) is provided as input to a synthesis module (504) that may, in an example, employ a neural network training module (505) using a collection of training images (506) to produce a capture neural network model (508). Another process commonly used in lieu of training process is photogrammetry. If the model (508) is created during process (500) depicted in FIG. 5, then the model (508) becomes one of the assets in the ingest format (507) for the natural content. Exemplary embodiments of the ingest format (507) include MPI and MSI.

Figure 6:
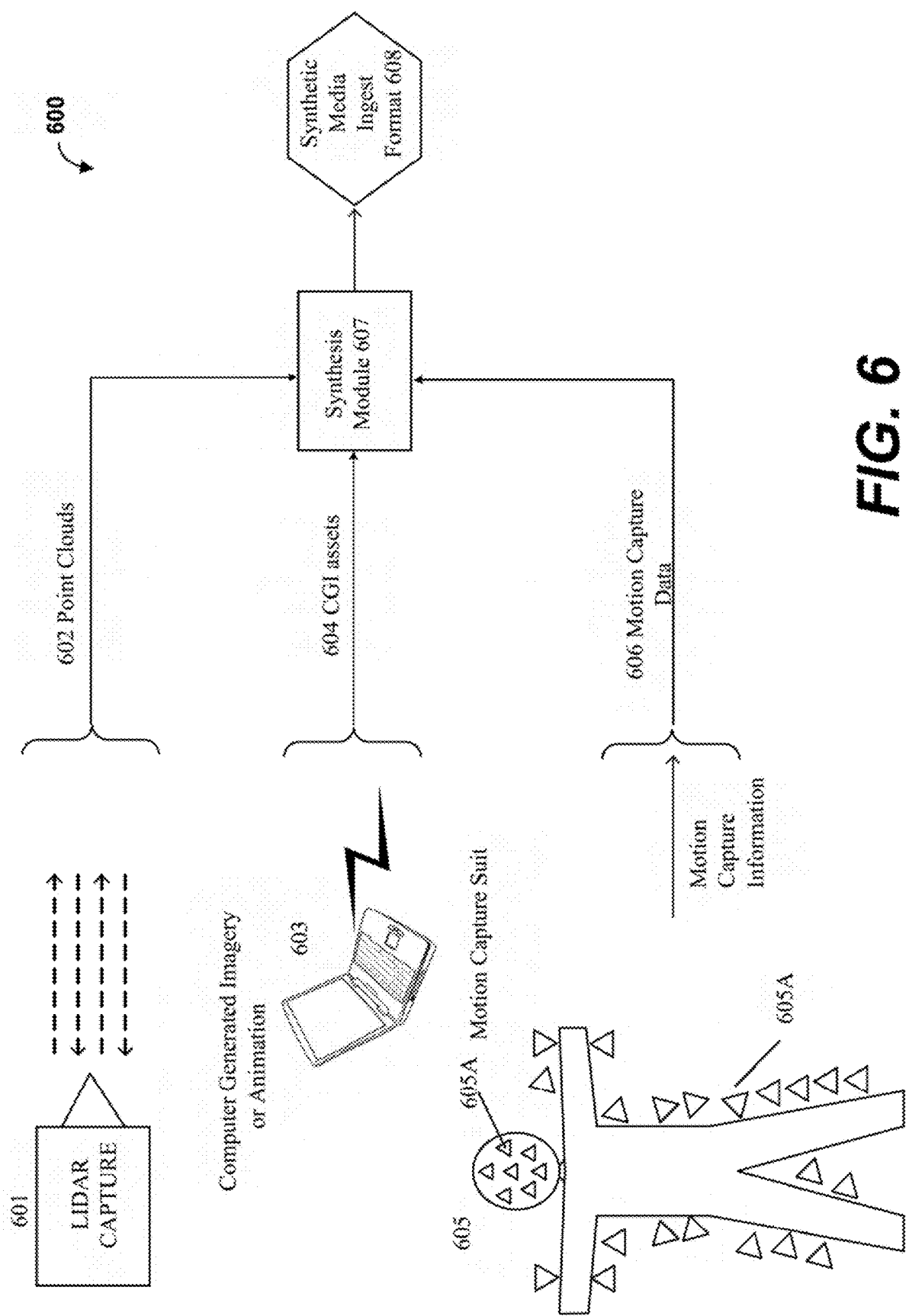
FIG. 6 is a diagram of a process of using three dimensional (3D) modeling tools and formats to create a representation of a synthetic scene that can be used as an ingest format for a network that serves heterogenous client end-points in some examples.

FIG. 6 shows a diagram of a process (600) to create an ingest format for synthetic media (608), e.g., computer-generated imagery. In the FIG. 6 example, LIDAR camera (601) captures point clouds (602) of a scene. Computer-generated imagery (CGI) tools, 3D modelling tools, or another animation processes to create synthetic content are employed on computer (603) to create (604) CGI assets over a network. Motion capture suit with sensors (605A) are worn on actor (605) to capture a digital recording of the motion for actor (605) to produce animated motion capture (MoCap) Data (606). Data (602), (604), and (606) are provided as input to a synthesis module (607) which likewise may, for example, use a neural network and training data to create a neural network model (not shown in FIG. 6).

Figure 7:
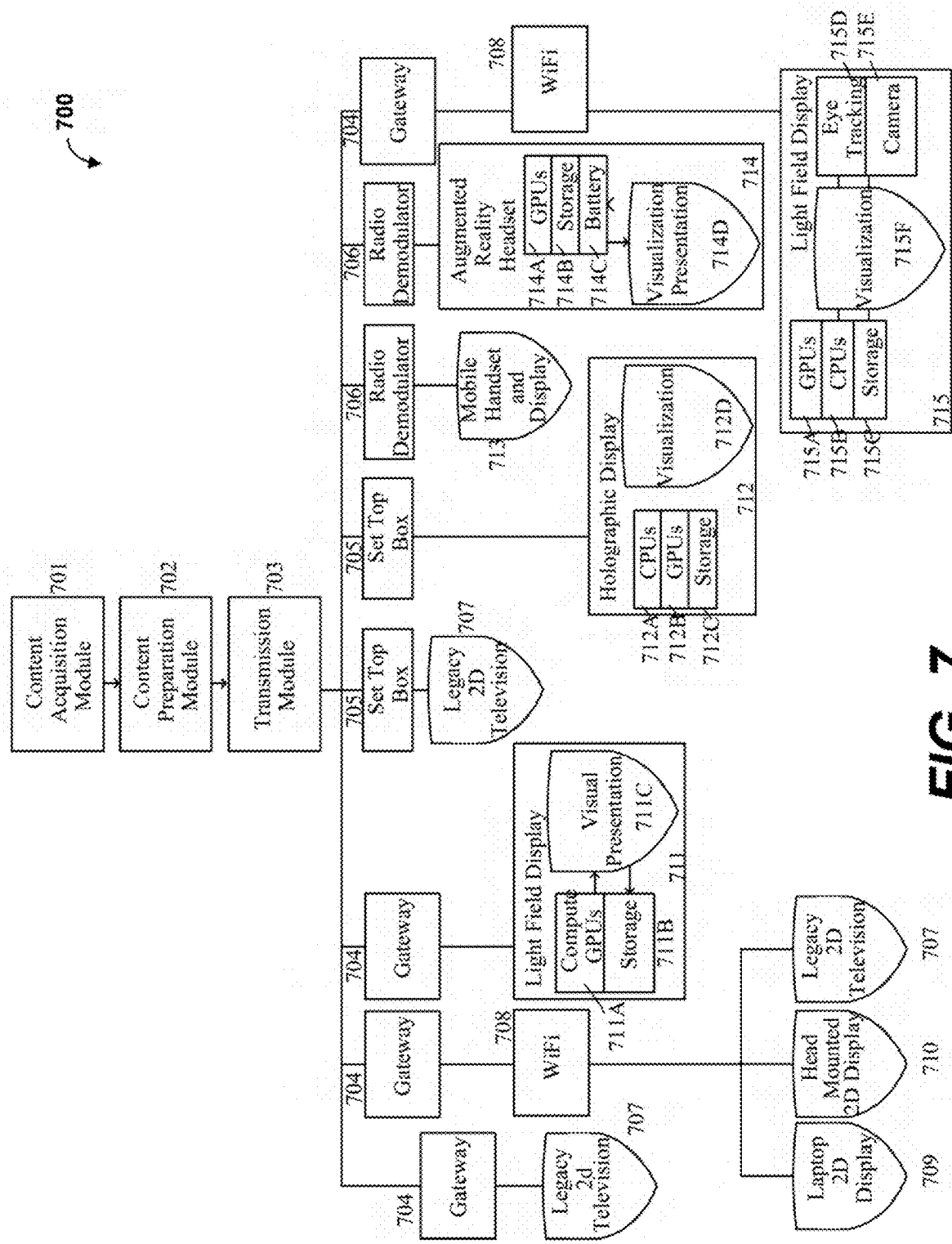
FIG. 7 is a diagram of a network that serves a plurality of heterogenous client end-points in some examples.

FIG. 7 shows a network media distribution system (700) that supports a variety of legacy and heterogenous immersive-media capable displays as client end-points in some examples. In the FIG. 7 example, content acquisition module (701) captures or creates the media using example embodiments in FIG. 6 or FIG. 5. Ingest formats are created in content preparation module (702) and then are transmitted to one or more client end-points in a network media distribution system using transmission module (703). Gateways (704) may serve customer premise equipment to provide network access to various client end-points for the network. Set top boxes (705) may also serve as customer premise equipment to provide access to aggregated content by the network service provider. Radio demodulators (706) may serve as mobile network access points for mobile devices (e.g., as with mobile handset and displays (713)). In one or more embodiments, legacy 2D televisions (707) may be directly connected to gateways (704), set-top boxes (705), or WiFi routers (708). A computer laptop with a legacy 2D display (709) may be a client end-point connected to a WiFi router (708). A head mounted 2D (raster-based) display (710) may also connected to a router (708). A Lenticular light field display (711) may be connected to a gateway (704). The display (711) may be comprised of local compute GPUs (711A), storage devices (711B), and a visual presentation unit (711C) that creates multiple views using a ray-based lenticular optical technology. A Holographic Display (712) may be connected to a set top box (705) and may include local compute CPUs (712A), GPUs (712B), storage devices (712C), and a Fresnal pattern, wave-based holographic visualization unit (712D). An augmented reality headset (714) may be connected to a radio demodulator (706) and may include a GPU (714A), a storage device (714B), a battery (714C), and a volumetric visual presentation component (714D). A dense light field display (715) may be connected to a WiFi router (708) and may include multiple GPUs (715A), CPUs (715B), and storage devices (715C); an eye tracking device (715D); a camera (715E); and a dense ray-based light field panel (715F).

Figure 8:
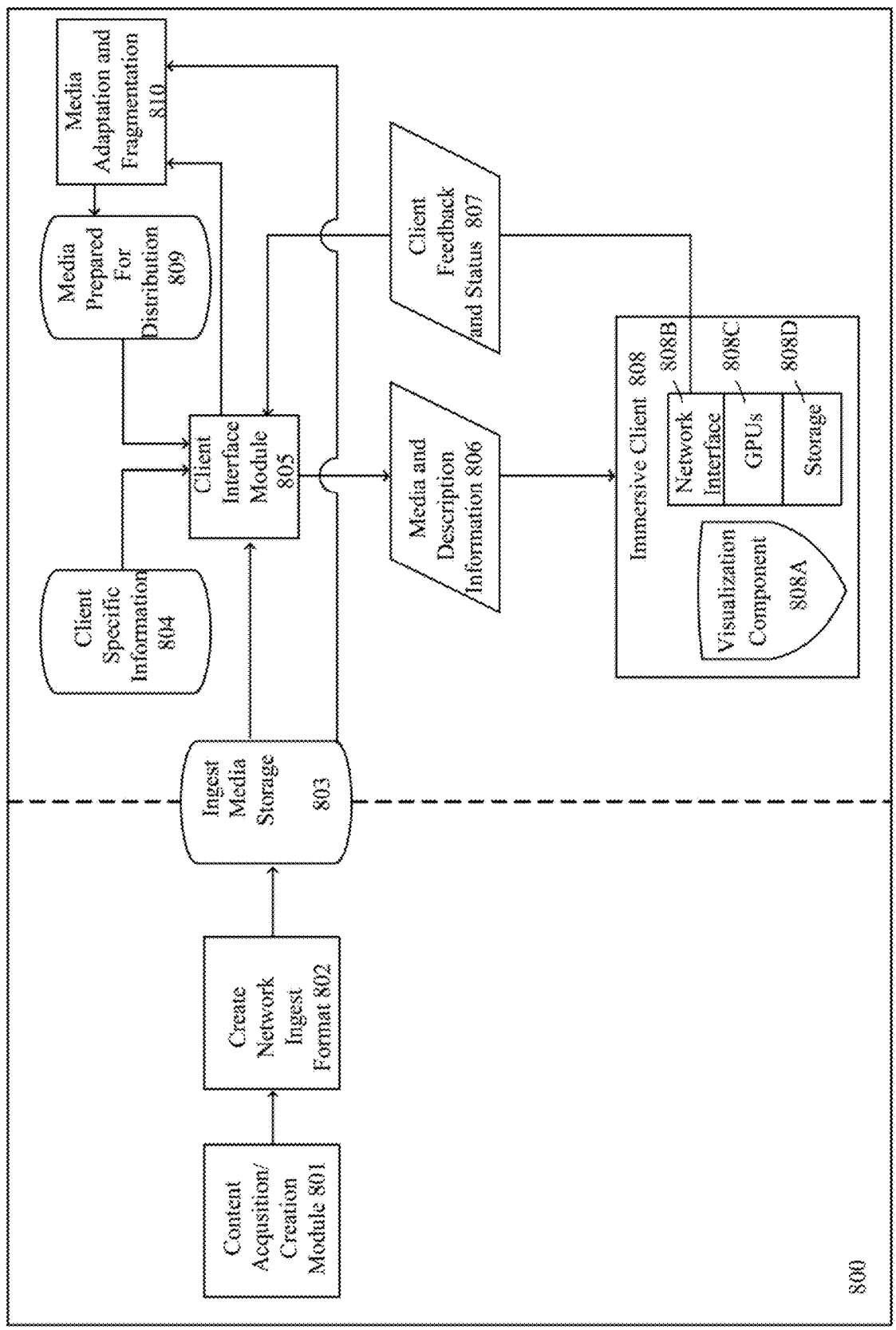
FIG. 8 is a diagram of a network providing adaptation information about the specific media represented in the media ingest format prior to the network's process of adapting the media for consumption by a specific immersive media client end-point in some examples.

FIG. 8 shows a diagram of an immersive media distribution module (800) that is capable of serving legacy and heterogenous immersive media-capable displays as previously depicted in FIG. 7. Content is either created or acquired in module (801), which is embodied in FIG. 5 and FIG. 6 for natural and CGI content respectively. Content is then converted into an ingest format using the create network ingest format module (802). Some examples of the module (802) are embodied in FIG. 5. and FIG. 6 for natural and CGI content respectively. The ingest media format is transmitted to the network and stored on storage device (803). In some other examples, the storage device may reside in the immersive media content producer's network, and accessed remotely by the immersive media network distribution module (800) as depicted by the dashed line that bisects. Client and application specific information is, in some examples, available on a remote storage device (804), which may optionally exist remotely in an alternate cloud network in an example.

As depicted in FIG. 8, a client interface module (805) (e.g., referred to as server device in some examples) serves as the primary source and sink of information to execute the major tasks of the distribution network. In this particular embodiment, the client interface module (805) may be implemented in unified format with other components of the network. Nevertheless the tasks depicted by the client interface module (805) in FIG. 8 form elements of the disclosed subject matter in some examples. The client interface module (805) may further employ a bidirectional protocol for communication with the client device to facilitate all processing and distribution of the media in accordance with the characteristics of the client device. Furthermore, the bidirectional protocol may be implemented across different delivery channels, i.e., a control plane channel and a data plane channel.

According to some aspects of the disclosure, the client interface module (805) may further employ a bidirectional protocol for communication with client devices to facilitate processing and distribution of the media (e.g., immersive media) in accordance with the characteristics of the client devices.

The client interface module (805) receives information about the features and attributes of client devices, such as a client (808) (also referred to as client device (808)) in FIG. 8, and furthermore collects requirements regarding the application currently running on the client (808). This information may be obtained from device (804), or in an alternate embodiment, may be obtained by directly querying the client (808). In some examples, a bidirectional protocol is used to enable direct communication between the client interface module (805) and the client (808). For example, the client interface module (805) can send a direct query to the client (808). An example of messages in the bidirectional protocol is provided with reference to FIGS. 16A-C, FIGS. 17A-G and FIG. 18.

The client interface module (805) also initiates and communicates with media adaptation and fragmentation module (810) which will be described in FIG. 9. As ingest media is adapted and fragmented by the module (810), the media is, in some examples, transferred to an intermedia storage device depicted as the media prepared for distribution storage device (809). As the distribution media is prepared and stored in device (809), the client interface module (805) ensures that immersive client (808), via its network interface (808B), either receives the distribution media and corresponding descriptive information (806) either through a push request, or client (808) itself may initiate a pull request of the media (806) from storage device (809). The immersive client (808) may, in some examples, employ GPUs (or CPUs not shown) (808C). The distribution format of the media is stored in client (808)'s storage device or storage cache (808D). Finally, the immersive client (808) visually presents the media via its visualization component (808A).

Throughout the process of streaming the immersive media to the immersive client (808), the client interface module (805) can monitor the status of the client's progress via client progress and status feedback channel (807).

Figure 9:
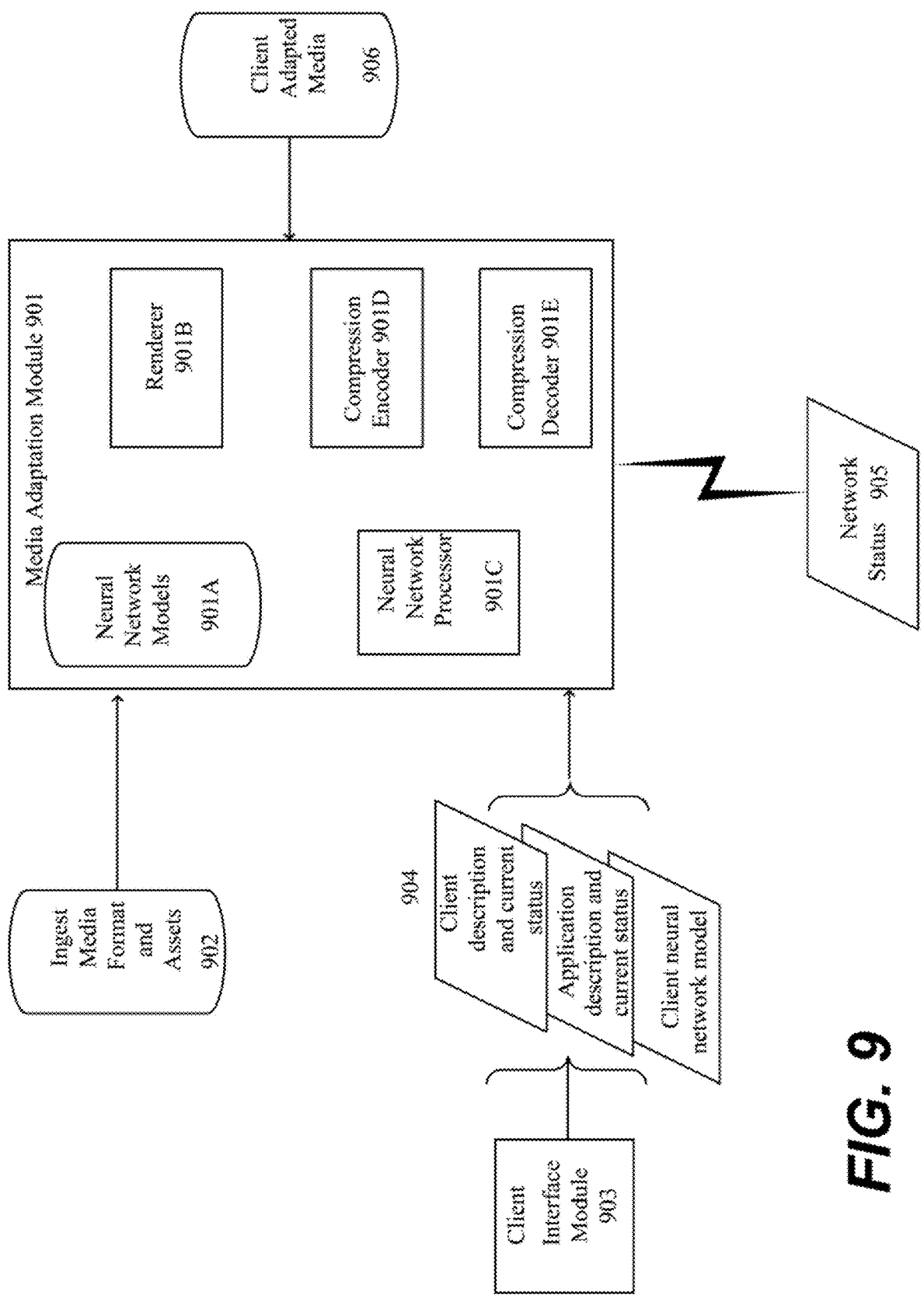
FIG. 9 is a system diagram of a media adaptation process including a media render-converter that converts a source media from an ingest format to a specific format suitable for a specific client end-point in some examples.

FIG. 9 depicts a diagram of a media adaptation process so that the ingested source media may be appropriately adapted to match the requirements of the immersive client (808) in some examples. A media adaptation module (901) is comprised of multiple components that facilitate the adaptation of the ingest media into an appropriate distribution format for immersive client (808). In FIG. 9, the media adaptation module (901) receives input network status (905) to track the current traffic load on the network. The immersive client (808) information can include attributes and features description, application features and description as well as application current status, and a client neural network model (if available) to aid in mapping the geometry of the client's frustum to the interpolation capabilities of the ingest immersive media. The media adaptation module (901) ensures that the adapted output, as it is created, is stored into a client-adapted media storage device (906).

In some examples, the media adaptation module (901) employs a renderer (901B) or a neural network processor (901C) to adapt the specific ingest source media to a format that is suitable for the client. In an example, the media adaptation module (901) receives client information (904) from a client interface module (903), such as a server device in an example. The client information (904) can include client description and current status, can application description and the current status, and can include client neural network model. The neural network processor (901C) uses neural network models (901A). Examples of such a neural network processor (901C) include the deepview neural network model generator as described in MPI and MSI. In some examples, the media is in a 2D format, but the client requires a 3D format, then the neural network processor (901C) can invoke a process to use highly correlated images from a 2D video signal to derive a volumetric representation of the scene depicted in the video. An example of such a process could be the neural radiance fields from one or few images process developed at the University of California, Berkley. An example of a suitable renderer (901B) could be a modified version of the OTOY Octane renderer (not shown) which would be modified to interact directly with the media adaptation module (901). The media adaptation module (901) may, in some examples, employ media compressors (901D) and media decompressors (901E) depending on the need for these tools with respect to the format of the ingest media and the format required by immersive client (808).

Figure 10:
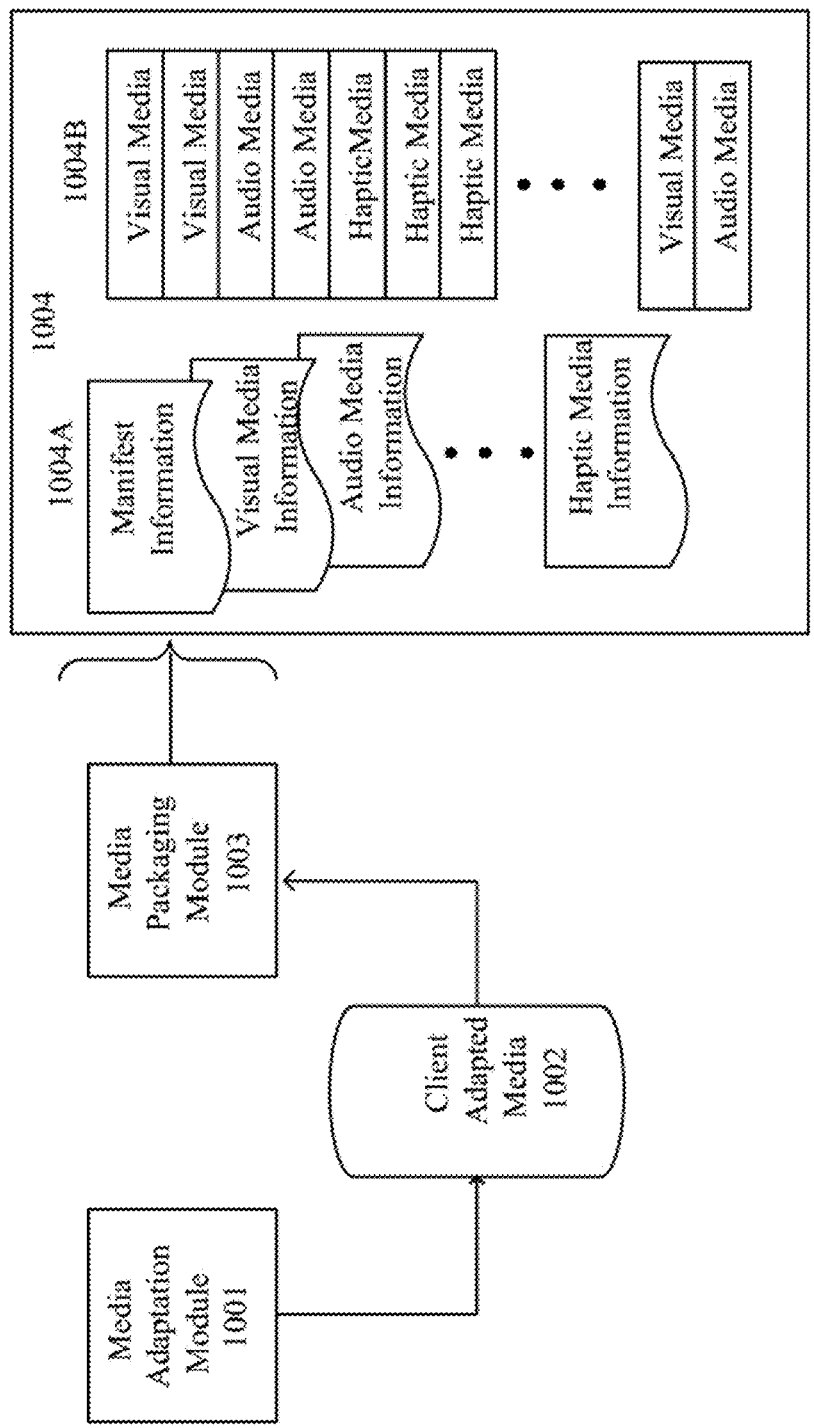
FIG. 10 is a diagram of a network formatting the adapted source media into a data model suitable for representation and streaming in some examples.

FIG. 10 shows an adapted media packaging process that ultimately converts the adapted media from media adaptation module (1001) (e.g., corresponding to the media adaption module (901) FIG. 9) now residing on client adapted media storage device (1002) in some examples. For example, a media packaging module (1003) formats the adapted media from the media adaption module (1001) into a robust distribution format (1004), for example, the exemplary formats shown in FIG. 3 or FIG. 4. Manifest Information (1004A) provides immersive client (808) with a list of the scene data that the client (808) can expect to receive and also provides a list of visual assets and corresponding metadata, and audio assets and corresponding metadata.

Figure 11:
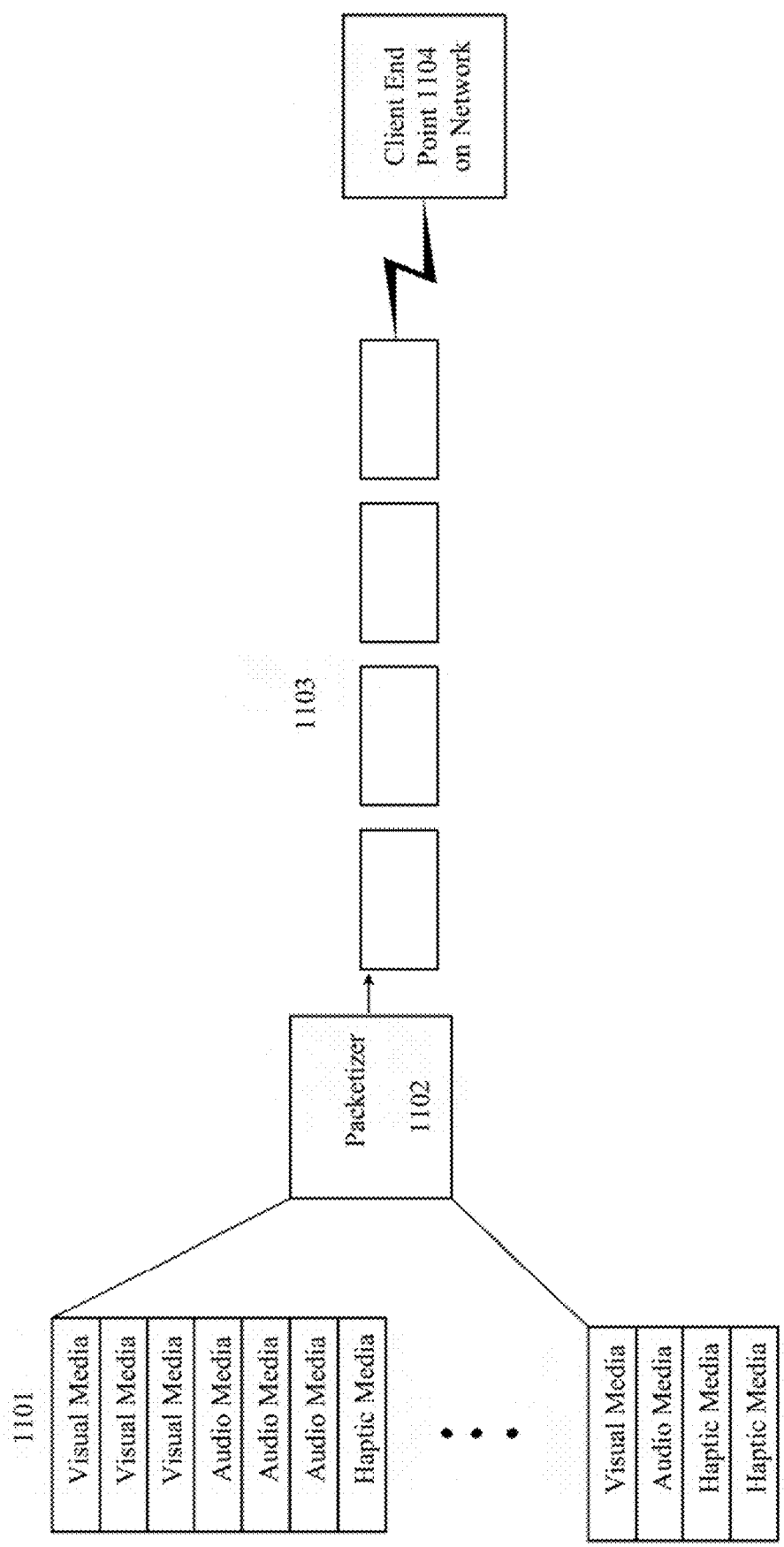
FIG. 11 is a system diagram of a media streaming process that fragments the data model of FIG. 11 into the payloads of network protocol packets in some examples.

FIG. 11 shows a fragmentation process in some examples. In the FIG. 11 example, a packetizer (1102) fragments various adapted media (1101) into individual packets (1103) that are suitable for streaming to the immersive client (808), shown as client end point (1104) on network.

Figure 12:
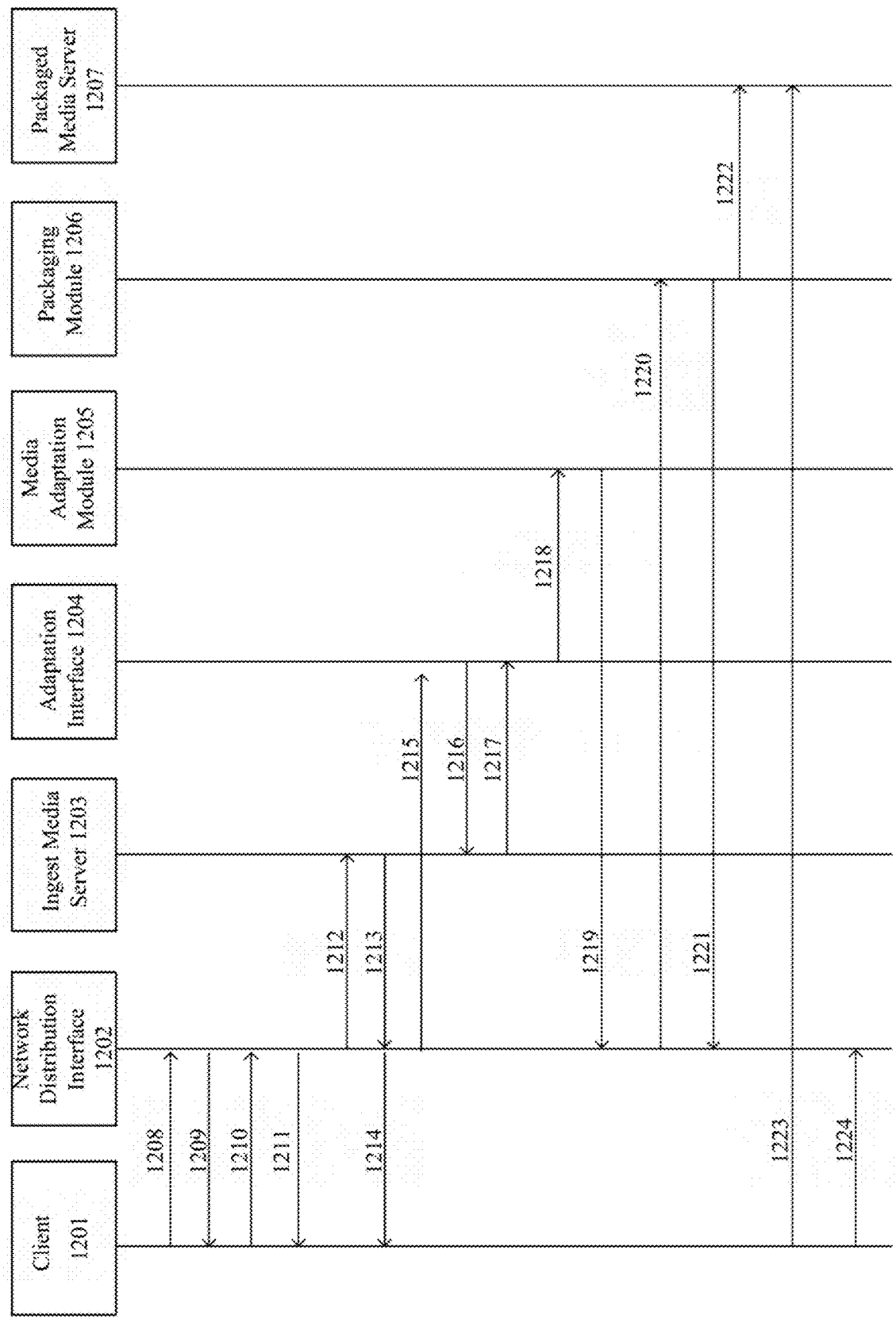
FIG. 12 is a sequence diagram of a network adapting a specific immersive media in an ingest format to a streamable and suitable distribution format for a specific immersive media client end-point in some examples.

FIG. 12 shows a sequence diagram of a network adapting a specific immersive media in an ingest format to a streamable and suitable distribution format for a specific immersive media client end-point in some examples.

The components and communications shown in FIG. 12 are explained as follows: client (1201) (also referred to as client end-point in some examples) initiates a media request (1208) to a network distribution interface (1202). The media request (1208) includes information to identify the media that is requested by the client (1201), either by URN or other standard nomenclature. The network distribution interface (1202) responds to media request (1208) with profiles request (1209), which requests that client (1201) provide information about its currently available resources (including compute, storage, percent battery charged, and other information to characterize the current operating status of the client). The profiles request (1209) also requests that the client provide one or more neural network models that can be used by the network for neural network inferencing to extract or interpolate the correct media views to match the features of the client's presentation system, if such models are available at the client. Response (1210) from client (1201) to the network distribution interface (1202) provides a client token, application token, and one or more neural network model tokens (if such neural network model tokens are available at the client). The network distribution interface (1202) then provides client (1201) with a session ID token (1211). The network distribution interface (1202) then requests ingest media server (1203) with ingest media request (1212), which includes the URN or standard nomenclature name for the media identified in request (1208). The ingest media server (1203) replies to the request (1212) with a response (1213) which includes an ingest media token. The network distribution interface (1202) then provides the media token from the response (1213) in a call (1214) to client (1201). The network distribution interface (1202) then initiates the adaptation process for the media request (1208) by providing the adaptation interface (1204) with the ingest media token, client token, application token, and neural network model tokens (1215). The adaptation interface (1204) requests access to the ingest media by providing the ingest media server (1203) with the ingest media token at call (1216) to request access to the ingest media assets. The ingest media server (1203) responds to request (1216) with an ingest media access token in response (1217) to the adaptation interface (1204). The adaptation interface (1204) then requests that media adaptation module (1205) adapt the ingest media located at the ingest media access token for the client, application, and neural network inference models corresponding to the session ID token created at (1213). Request (1218) from the adaptation interface (1204) to media adaptation module (1205) contains the required tokens and session ID. The media adaptation module (1205) provides the network distribution interface (1202) with adapted media access token and session ID in update (1219). The network distribution interface (1202) provides the packaging module (1206) with adapted media access token and session ID in interface call (1220). The packaging module (1206) provides response (1221) to the network distribution interface (1302) with the packaged media access token and session ID in response message (1221). The packaging module (1206) provides packaged assets, URNs, and the packaged media access token for the session ID to the packaged media server (1207) in response (1222). Client (1201) executes request (1223) to initiate the streaming of media assets corresponding to the packaged media access token received in response message (1221). The client (1201) executes other requests and provides status updates in message (1224) to the network distribution interface (1202).

Figure 13:
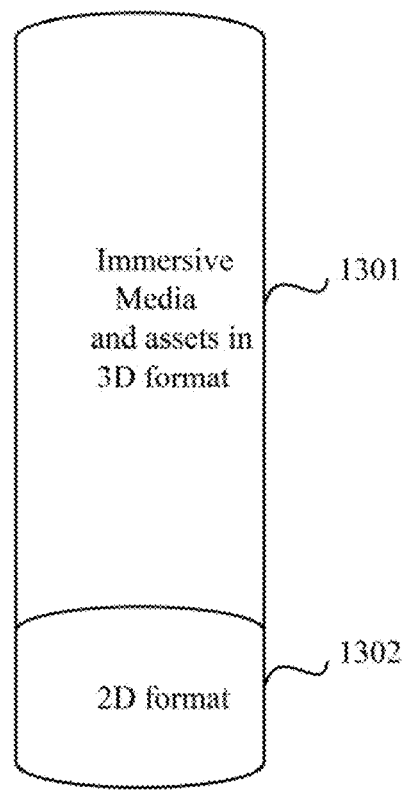
FIG. 13 is a diagram of the ingest media formats in some examples.

FIG. 13 depicts the ingest media format and assets (902) of FIG. 9, in some examples, consisting of two parts: immersive media and assets in 3D format (1301) and 2D format (1302). The 2D format (1302) may be a single view coded video stream, e.g., ISO/IEC 14496 Part 10 Advanced Video Coding, or it may be a coded video stream that contains multiple views, e.g., multi-view compression amendment to ISO/IEC 14496 Part 10.

Figure 14:
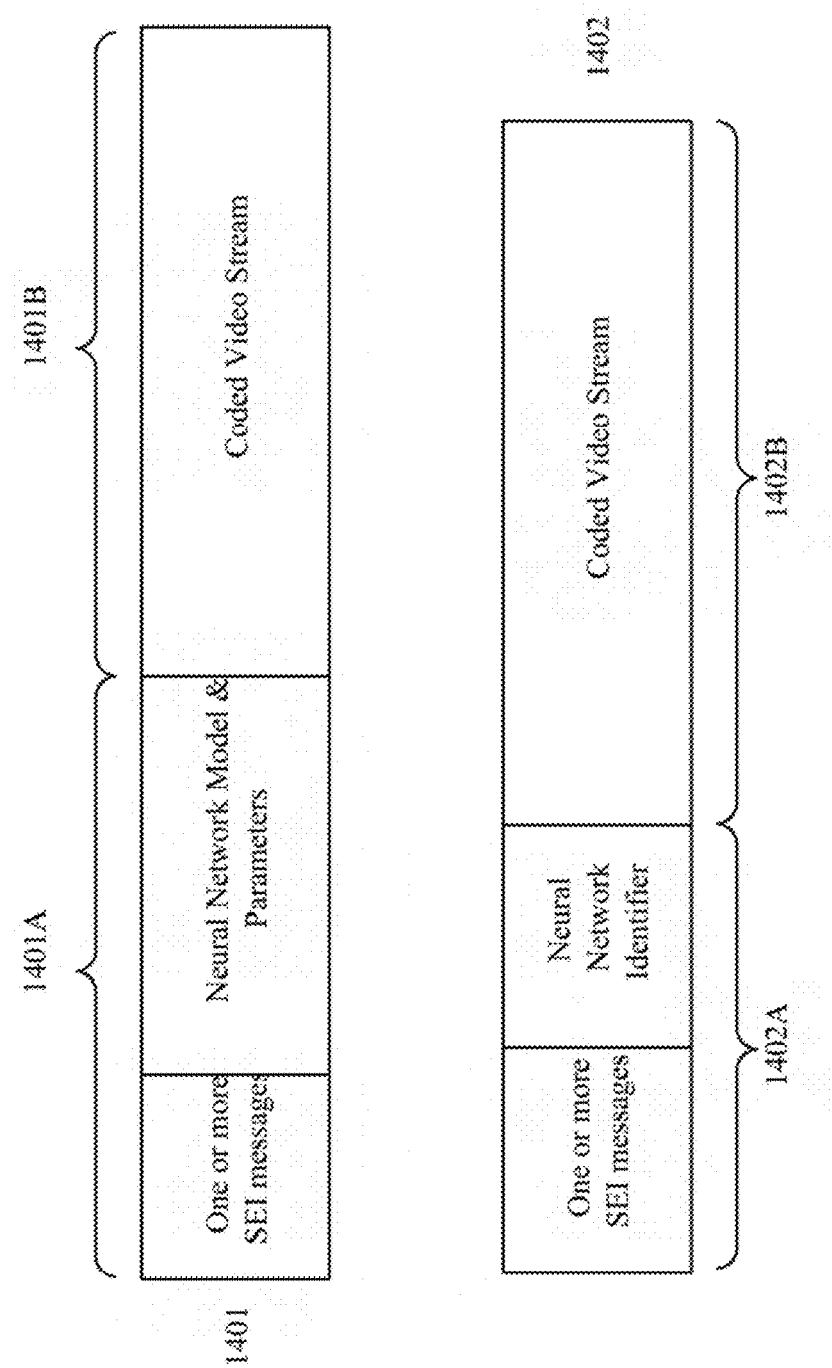
FIG. 14 shows the carriage of neural network model information along with a coded video stream in some examples.

FIG. 14 depicts the carriage of neural network model information along with a coded video stream. In FIG. 14, coded video stream (1401) includes the neural network model and corresponding parameters directly carried by one or more SEI messages (1401A) and coded video stream (1401B). Whereas in coded video stream (1402), the one or more SEI messages carries an identifier for the neural network model and its corresponding parameters (1402A) and the coded video bitstream (1402B). In the scenario for (1402), the neural network model and parameters are stored outside of the coded video stream, for example, in (901A) of FIG. 9.

Figure 15:
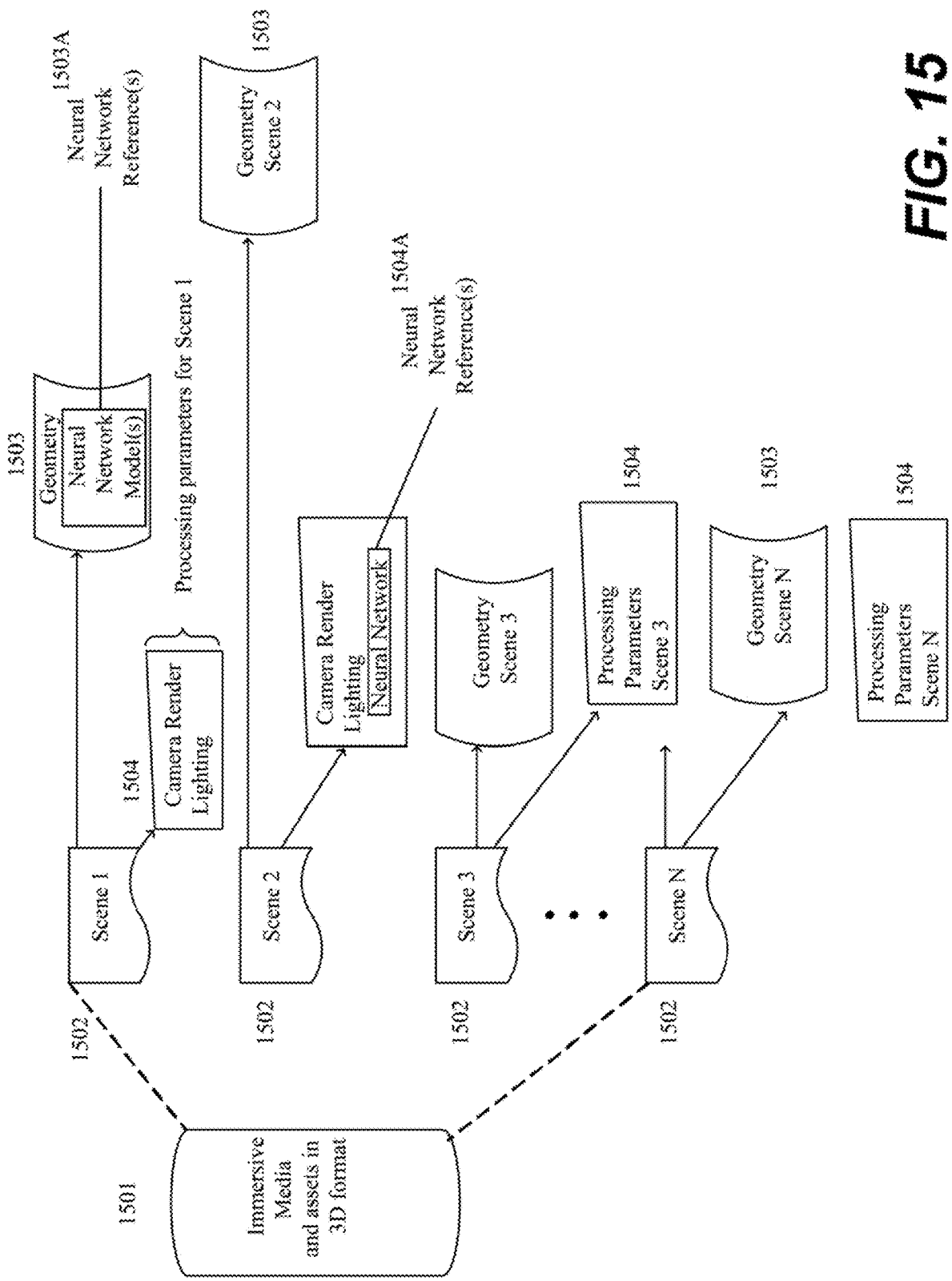
FIG. 15 shows the carriage of neural network model information along with input immersive media and assets in some examples.

FIG. 15 depicts the carriage of neural network model information in the ingested immersive media and assets 3D format (1501) (corresponding to immersive media and assets in 3D format (1301) in FIG. 13). The ingested immersive media and assets 3D format (1501) refers to scenes 1 through N depicted as (1502). Each scene (1502) refers to geometry (1503) and processing parameters (1504). Geometry (1503) may contain references (1503A) to neural network models. Processing parameters (1504) may also contain references (1504A) to a neural network model. Both (1504A) and (1503A) may refer to the network model directly stored with the scene or to identifiers that refer to neural network models that reside outside of the ingested media, for example, network models stored in (901A) of FIG. 9.

It is noted that the various modules in the present disclosure can be individual devices, or can be components in a device. In some examples, a module can be an individual device, and can be coupled with other devices. In some examples, a module can be processing circuitry, and can be interconnected with other processing circuitry. In some examples, a module can be software instruction module, and can be executed by one or more processors.

Some aspects of the disclosure provide a bidirectional protocol with bidirectional messages that allow a media distribution network's client interface (i.e., also referred to as a server device) to communicate directly with a client presentation end-point (i.e., also referred to as a client device). In some examples, the bidirectional protocol can be implemented in a network layer above transport layer. In some examples, using the bidirectional protocol, the server device can obtain information about the client-specific characteristics and supported features of the client device. In some examples, using the bidirectional protocol, the server device can manage the distribution of the media to the client device by establishing a unique session and operating context for the adaptation and distribution of the media to the client device. In some examples, using the bidirectional protocol, the server device can respond to situations during the session when or if the client device needs to rely on the network to supplement the client device's resources, e.g., for compute or storage, in the presentation of the specific media. In some examples, the bidirectional protocol can assist the sever device in an adaptation process of the input media to match the capabilities of the client device. In some examples, the bidirectional protocol can enable the efficient re-use of specific media assets for presentation across multiple client devices when or if such re-use is permitted by the content creator, e.g., the studio or client devices. In some examples, using the bidirectional protocol, the server device can facilitate the client device's near real-time presentation of the media according to existing service level agreements between a network operator (also known as wireless service provider, wireless carrier, mobile network carrier) and the client device. In some examples, using the bidirectional protocol, the server device can facilitate the client device's near real-time presentation of the media according to the requirements of the application, e.g., an interactive game vs. a linear passive viewing experience.

According to an aspect of the disclosure, the bidirectional protocol is used to form bidirectional presentation datastream for the server device communicating directly with the client device. The bidirectional presentation datastream includes a series of messages that are exchanged between the server device and the client device in order to facilitate the timely adaptation of the input media to a suitable distribution format for the client device, and the streaming of adapted media to the client device for presentation.

The bidirectional protocol can be used to build a media distribution network that can support a variety of diverse client devices that require asset types in various formats, and that can reuse assets that have previously been adapted for use by a particular client.

FIGS. 16A-16C provide a list of messages that can be exchanged between a server device (e.g., shown as client interface module (805) in FIG. 8) and a client device (e.g., shown as immersive client (808) in FIG. 8) in some examples. In some examples, the list of messages can include the messages and information (806) that are originated from the server device and sent to the client device, and can include the feedback and status (807) that are originated from the client device and sent to the server device.

FIGS. 16A-16B show a first group of messages (messages that are numbered 1 through 20) that are sent from the server device to the client device; and FIG. 16C shows a second group of messages (messages that are numbered 21 through 31) that are sent from the client device to the server device according to some embodiments.

FIGS. 17A-17G show a table of semantic information for the first group of messages in some examples. FIG. 18 shows a table of semantic information for the second group of messages in some examples.

It is noted that the messages in FIGS. 16A-16C, FIGS. 17A-17G, and FIG. 18 are for illustration. The messages in the bidirectional protocol can be modified and/or omitted. Additional messages can be added.

In some implementation, a media distribution network can use messages defined by the bidirectional protocol to facilitate the adaptation and the streaming of media, such as immersive media content. In some examples, the bidirectional protocol can include specific messages that signal actions to execute. For example, a specific message can cause the client device to send its processing characteristics to the server device, so that upon receiving the processing characteristic of the client device, the server device is equipped with sufficient information to meaningfully adapt the ingested media to a format suitable for the client device. In another example, messages can be exchanged between the server device and client device to allow the server device to send a manifest of scenes for a presentation that an end-user of the client device wishes to experience. For example, upon receiving such a manifest, the client device can begin the necessary steps to prepare to create the presentation, including requesting each of the assets for the first scene, the second scene, and so on. The server device in turn may respond to each request for an asset by either sending the asset directly to the client from a media source or by informing the client to fetch the asset from a nearby database. In response to message requests, the client device or the server device may respond with an acknowledgement to indicate the request in the message was successfully performed, or a negative acknowledgement to indicate that an error occurred.

Some aspects of the disclosure provide techniques to facilitate the implementation of the bidirectional protocol. For example, messages in the bidirectional protocol are separated into two categories: control messages and data messages. In some examples, the data messages include media data for delivery, and the control messages includes control information for delivering the data messages. For example, the control messages can include setup information to prepare the delivery of the data messages, the handling information during the delivery of the data messages, checking information after the delivery of the data messages and the like.

Further, separate communication techniques are used to deliver the control messages and the data messages. For example, first communication techniques that enable fast delivery can be used to deliver data messages, and second communication techniques that ensure reliable delivery can be used to deliver control messages. For example, lower-latency network transport protocol, such as user datagram protocol (UDP) can be used to deliver the data messages, and a connection based network transport protocol that is more reliable, such as transmission control protocol (TCP) can be used to deliver the control messages. The TCP can ensure ordering, reliability and integrity. The UDP reduces overhead and latency, and can send bulk quantity of data units.

In some examples, control messages form a control plane, and a control plane channel refers to integral components in a media distribution network architecture for delivery of the control messages. In an example, a control plane channel can be setup according to TCP protocol to deliver the control messages. Further, data messages form a data plane, and a data plane channel refers to integral components in a media distribution network architecture for delivery of the data messages. In an example, a data plane channel can be setup according to UDP to deliver the data messages.

In this way, media data can be transmitted over the data plane channel with less delay, and control information, such as setup information, monitoring information and status notification for assisting the transmission over the data plane channel, can be transmitted over the control plane channel to ensure successfully data message transmissions or to detect errors in the transmission over the data plane channel and trigger retransmission over the data plane channel.

According to an aspect of the disclosure, the bidirectional communication with separate control plane channel and data plane channel can be used to build a media distribution network that can support a variety of diverse client devices that require asset types in various formats, and that can reuse assets that have previously been adapted for use by a particular client device. With the separation of bidirectional communication over the control plane channel and the data plane channel, in some examples, a more robust and efficient media distribution network can be implemented with the data messages being carried over a transport layer that requires less latency but is less reliable, while the control messages are carried over a more reliable transport layer that is also slower to deliver messages.

Figure 19A:
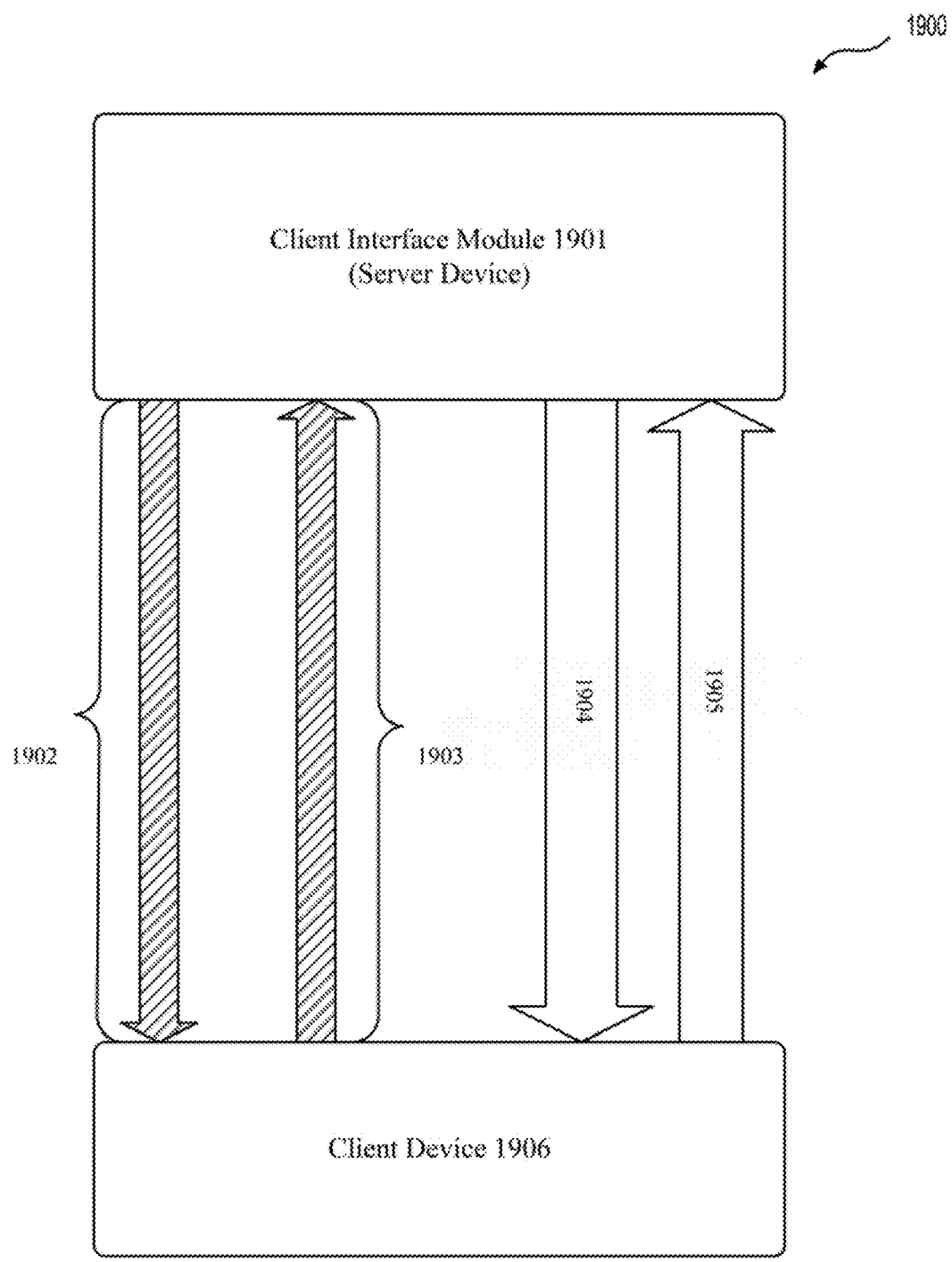

FIG. 19A shows a block diagram of a media system (1900) according to some embodiments of the disclosure. The media system (1900) includes a sever device (1901) and a client device (1906). The server device (1901) is also referred to as client interface module in a media distribution network (e.g., client interface module (805)) in some examples. In the FIG. 19A example, communication channels (1902), (1903), (1904) and (1905) can be setup for bidirectional communication between the server device (1901) and the client device (1906). In some examples, a communication channel can refer to a physical transmission medium or can refer to a logical connection over multiplexed medium in telecommunications and computer networking.

Specifically, the communication channel (1902) is configured to deliver control messages from the server device (1901) to the client device (1906). FIG. 19B shows a list of control messages from the bidirectional protocol in FIGS. 16A-16C that can be delivered by the communication channel (1902).

The communication channel (1903) is configured to deliver control messages from the client device (1906) to the server device (1901). FIG. 19C shows a list of control messages from the bidirectional protocol in FIGS. 16A-16C that can be delivered by the communication channel (1903).

In some examples, the communication channel (1902) and the communication channel (1903) can be a control plane channel that is bidirectional. The control messages in FIG. 19B and FIG. 19C form a control plane of the bidirectional protocol.

The communication channel (1904) is configured to deliver data messages from the server device (1901) to the client device (1906). FIG. 19D shows a list of control messages from the bidirectional protocol in FIGS. 16A-16C that can be delivered by the communication channel (1904).

The communication channel (1905) is configured to deliver data messages from the client device (1906) to the server device (1901). FIG. 19E shows a list of control messages from the bidirectional protocol in FIGS. 16A-16C that can be delivered by the communication channel (1905).

In some examples, the communication channel (1904) is a data plane channel that is unidirectional, and the communication channel (1905) is another data plane channel that is unidirectional. The data messages in FIG. 19D and FIG. 19E form a data plane of the bidirectional protocol.

It is noted that messages in FIGS. 19B-19E are for illustration. The messages in the communication channels (1902)-(1905) can be modified and/or omitted. Additional messages can be added.

Figure 20:
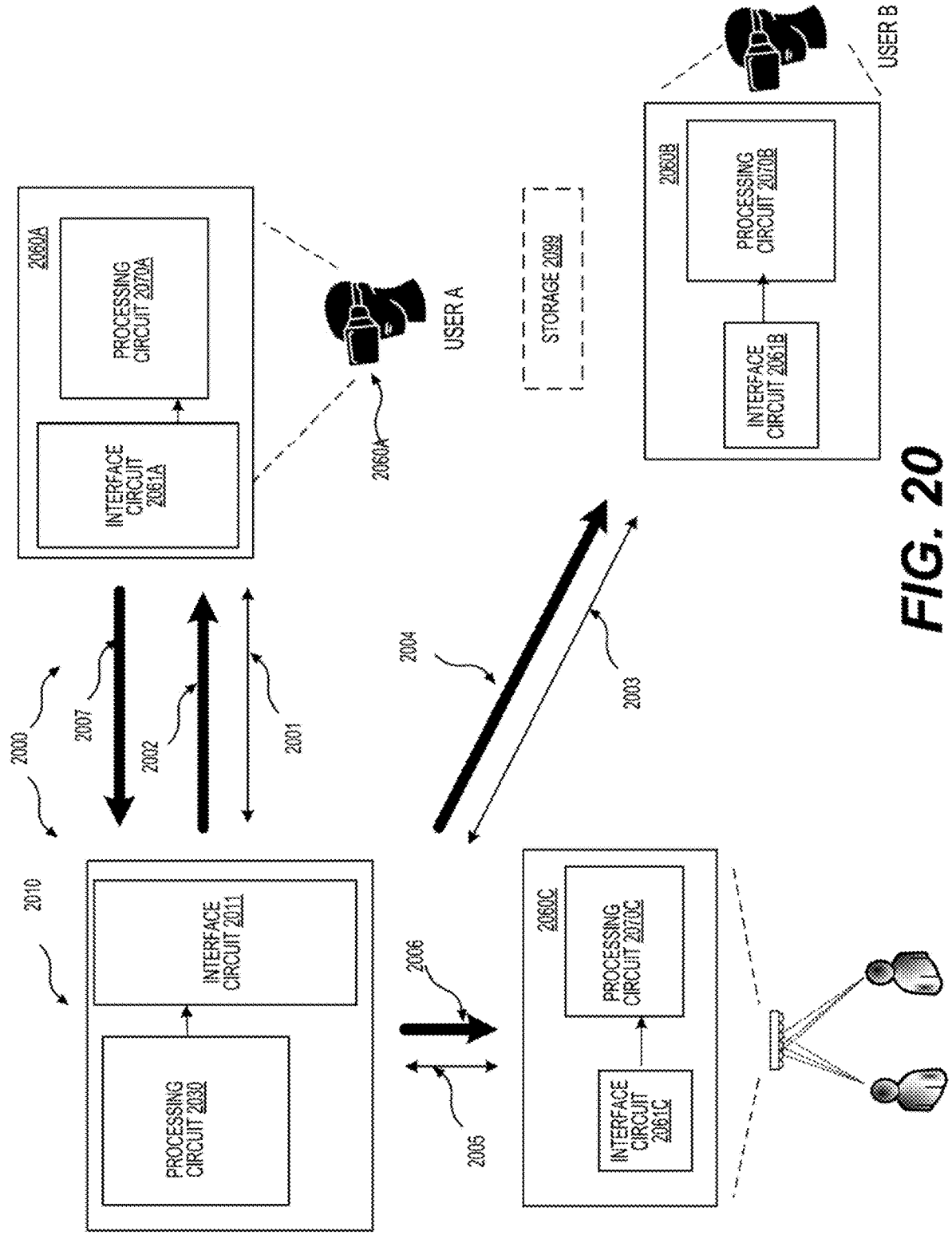
FIG. 20 shows a diagram of a media system using a bidirectional protocol over separate control plane channels and data plane channels for distribution of immersive media in some examples.

FIG. 20 shows a block diagram of a media system (2000) for illustrating the use of a bidirectional protocol in some examples. In some examples, the bidirectional protocol can include the messages in FIGS. 16A-16C, FIGS. 17A-17G, and FIG. 18. The messages can be separated into the control plane and the data plane according to FIGS. 19A-19E.

The media system (2000) can be used in various use applications, such as immersive media application, augmented reality (AR) application, virtual reality application, video game application, sports game animation application, a teleconference and telepresence application, a media streaming application, and the like.

The media system (2000) includes a server device (2010) and a plurality of media client devices, such as client devices (2060A), (2060B) and (2060C) shown in FIG. 20, that can be connected by a network (not shown). In an example, the server device (2010) can include one or more devices with immersive media coding functionalities. In an example, the server device (2010) includes a single computing device, such as a desktop computer, a laptop computer, a server computer, a tablet computer and the like. In another example, the server device (2010) includes data center(s), server farm(s), and the like. The server device (2010) can receive input media content, such as immersive content, video content, audio content and the like, and the like. The client devices (e.g., the client devices (2060A), (2060B) and (2060C)) respectively include one or more devices with media presentation functionality for media applications. In an example, a media client device can include a presenting device, such as a desktop computer, a laptop computer, a server computer, a tablet computer, a head mounted display (HMD) device, a lenticular light field display, and the like. The media client device can present media in accordance to suitable media presenting format in some examples.

The server device (2010) can be implemented using any suitable technology. In the FIG. 20 example, the server device (2010) includes a processing circuit (2030) and an interface circuit (2011) coupled together.

The processing circuit (2030) can include any suitable processing circuitry, such as one or more central processing units (CPUs), one or more graphics processing units (GPUs), application specific integrated circuit, and the like. In the FIG. 20 example, the processing circuit (2030) is configured to form messages according to the bidirectional protocol and can interpret messages according to the bidirectional protocol. Further, the processing circuitry (2030) can generate a media stream that carries media content. In some examples, the media stream can be adapted based on messages that are exchanged between the server device (2010) and the media client devices.

The interface circuit (2011) can interface the server device (2010) with the network. The interface circuit (2011) can include a receiving portion that receives signals from the network and a transmitting portion that transmits signals to the network. For example, the interface circuit (2011) can transmit signals that carry messages to other devices, such as the client device (2060A), the client device (2060B), the client device (2060C), and the like via the network. The interface circuit (2011) can receive signals that carry messages from the media client devices, such as the client devices (2060A), (2060B) and (2060C).

The network is suitably coupled with the server device (2010) and the client devices (e.g., the client devices (2060A), (2060B) and (2060C)) via wired and/or wireless connections, such as Ethernet connections, fiber-optic connections, WiFi connections, cellular network connections and the like.

The client devices (e.g., the client devices (2060A), (2060B) and (2060C)) are respectively configured for media presentation and bidirectional communication using the bidirectional protocol.

The media client devices, such as the client devices (2060A), (2060B) and (2060B) can be implemented using any suitable technology. In the FIG. 20 example, the client devices (2060A) and (2060B) are shown, but not limited to head mounted displays (HMDs) with earphones as user equipment that can be used by respective users, such as user A and user B. The client device (2060C) is shown, but not limited to a lenticular light field display that can display content that can be viewed by up to multiple users simultaneously, where each user is experiencing his or her own unique perspective (i.e., view) of the content that is being displayed.

In FIG. 20, the client device (2060A) includes an interface circuit (2061A), and a processing circuit (2070A) coupled together as shown in FIG. 20. The client device (2060B) includes an interface circuit (2061B), and a processing circuit (2070B) coupled together as shown in FIG. 20. The client device (2060C) includes an interface circuit (2061C), and a processing circuit (2070C) coupled together as shown in FIG. 20.

The interface circuit (2061A) can interface the client device (2060A) with the network. The interface circuit (2061A) can include a receiving portion that receives signals from the network and a transmitting portion that transmits signals to the network. For example, the interface circuit (2061A) can receive signals carrying messages from the server device (2010), and can transmit signals carrying messages to the server device (2010).

The processing circuit (2070A) can include suitable processing circuitry, such as CPU, GPU, application specific integrated circuits and the like. The processing circuit (2070A) can be configured to include various components, such as media decoders, a render and the like.

Similarly, the interface circuit (2061B) can interface the client device (2060B) with the network. The interface circuit (2061B) can include a receiving portion that receives signals from the network and a transmitting portion that transmits signals to the network. For example, the interface circuit (2061B) can receive signals carrying messages from the server device (2010), and can transmit signals carrying messages to the server device (2010).

The processing circuit (2070B) can include suitable processing circuitry, such as CPU, GPU, application specific integrated circuits and the like. The processing circuit (2070B) can be configured to include various components, such as media decoders, a render and the like.

Similarly, the interface circuit (2061C) can interface the client device (2060C) with the network. The interface circuit (2061C) can include a receiving portion that receives signals from the network and a transmitting portion that transmits signals to the network. For example, the interface circuit (2061C) can receive signals carrying messages from the server device (2010), and can transmit signals carrying messages to the server device (2010).

The processing circuit (2070C) can include suitable processing circuitry, such as CPU, GPU, application specific integrated circuits and the like. The processing circuit (2070C) can be configured to include various components, such as media decoders, a render and the like.

According to an aspect of the disclosure, the server device (2010) and the client device (2060A) can setup a control plane channel (2001) for exchanging (transmitting and/or receiving) control messages in between; the server device (2010) and the client device (2060B) can setup a control plane channel (2003) for exchanging control messages in between; and the server device (2010) and the client device (2060C) can setup a control plane channel (2005) for exchanging control messages in between. In an example, the control plane channels (2001), (2003) and (2005) can use TCP, and can perform bidirectional transmission of the control messages.

In some examples, data plane channels can be setup in the media system (2000) based on the control messages exchanged in the channel plane channels (2001), (2003) and (2005). In an example, a data plane channel (2002) can be setup between the server device (2010) and the client device (2060A) based on control messages exchanged over the control plane channel (2001); a data plane channel (2004) can be setup between the server device (2010) and the client device (2060B) based on control messages exchanged over the control plane channel (2003); a data plane channel (2006) can be setup between the server device (2010) and the client device (2060C) based on control messages exchanged over the control plane channel (2005). In an example, the data plane channels (2002), (2004) and (2006) can use UDP, and can perform unidirectional transmission of the data messages.

In some examples, using the control plane channels (2001), (2003) and (2005), the server device (2010) can obtain information about the client-specific characteristics and supported features of the client devices (2060A), (2060B) and (2060C). In an example, the server device (2010) can generate respective messages to the client devices (2060A), (2060B) and (2060C) to request information from the respective media client devices via the control channel planes (2001), (2003) and (2005). The information can include but not limited to a computing resource of the media client device, a storage resource of the media client device, a service level agreement of a network service provider with the media client device, an immersive application requirement of the media client device, a type of the media client device, a model of the media client device, a neural network model at the client device. The client devices (2060A), (2060B) and (2060C) can provide the requested information in response to the received messages from the server device (2010) via the control plane channels (2001), (2003) and (2005). In some examples, the client devices (2060A), (2060B) and (2060C) can provide the client-specific characteristics and supported features voluntarily without being requested.

In some examples, using the control messages exchanged over the control plane channels (2001), (2003) and (2005), the server device (2010) can manage the distribution of the media to the media client devices by establishing a unique session and operating context for the adaptation and distribution of the media to the media client device. In some examples, the control messages exchanged over the control plane channels (2001), (2003) and (2005), can assist the media sever device (2010) in an adaptation process of the input media to match the capabilities of the media client device.

For example, the server device (2010) can establish a first unique session (e.g., the data plane channel (2002)) with the client device (2060A) based on control messages exchanged over the control plane channel (2001). The server device (2010) can generate a first media stream that is adapted from the input media to match the capabilities of the client device (2060A). The data plane channel (2002) can provide the first media stream to the client device (2060A).

The server device (2010) can establish a second unique session (e.g., the data plane channel (2004)) with the client device (2060B) based on control messages exchanged over the control plane channel (2003). The server device (2010) can generate a second media stream that is adapted from the input media to match the capabilities of the client device (2060B). The data plane channel (2004) can provide the second media stream to the client device (2060B).

The server device (2010) can establish a third unique session (e.g., the data plane channel (2006)) with the client device (2060C) based on control messages exchanged over the control plane channel (2005). The server device (2010) can generate a third media stream that is adapted from the input media to match the capabilities of the client device (2060C). The data plane channel (2006) can provide the third media stream to the client device (2060C).

In some examples, using the control plane channels, the server device (2010) can respond to situations during the session when or if the media client device needs to rely on the network to supplement the client device's resources, e.g., for compute or storage, in the presentation of the specific media. In an example, the client device (2060B) informs the server device (2010) that the client device (2060B) needs to rely on the network to supplement computing resource (e.g., computing resource for rendering) via the control plane channel (2003). The server device (2010) can determine to provide supplement computing resource to the client device (2060B). For example, the server device (2010) can perform computation heavy media processing on the media data for the client device (2020B).

In some examples, using the control plane channels can enable the efficient re-use of specific media assets for presentation across multiple client devices when or if such re-use is permitted by the content creator, e.g., the studio or client devices. In an example, the server device (2010) can determine to reuse of media assets of the client device (2060A) to the client device (2060B). For example, the server device (2010) can obtain information of rendered media assets in cache (e.g., in a storage (2099)) from the client device (2060A) via the control plane channel (2001), and provide the information to the client device (2060B) via the control plane channel (2003). Then, the client device (2060B) can access the cache for the rendered media assets according to the information. It is noted that the storage (2099) can be an internal component of the client device (2060A) or can be an external component of the client device (2060A).

In another example, the server device (2010) may request the client device (2060A) to send back rendered media assets to the server device (2010), and then the server device (2010) can provide the received media assets to the client device (2060B). In an example, via the control plane channel (2001), another data plane channel (2007) is setup to send back rendered media assets from the client device (2060A) to the server device (2010).

Figure 21:
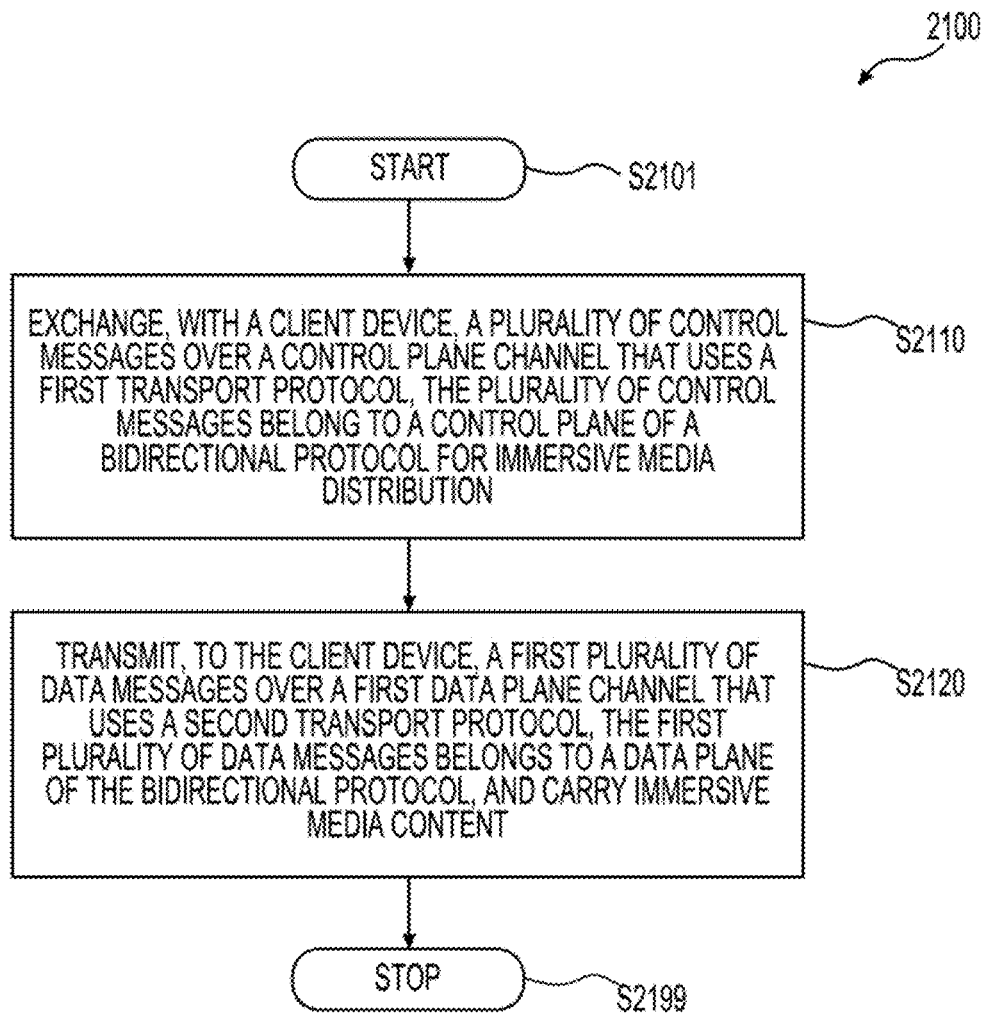
FIG. 21 shows a flow chart outlining a process according to some embodiment of the disclosure.

FIG. 21 shows a flow chart outlining a process (2100) according to an embodiment of the disclosure. The process (2100) can be used in a server device, such as the sever device (2010). In various embodiments, the process (2100) is executed by processing circuitry, such as the processing circuit (2030) in the server device (2010), and the like. In some embodiments, the process (2100) is implemented in software instructions, thus when the processing circuit executes the software instructions, the processing circuit performs the process (2100). The process starts at (S2101) and proceeds to (S2110).

At (S2110), the server device exchanges, with a client device, a plurality of control messages over a control plane channel that uses a first transport protocol. The plurality of control messages belong to a control plane of a bidirectional protocol for immersive media distribution. The bidirectional protocol for immersive media distribution can be implemented in a network layer above transport layer, such as application layer, presentation layer, and the like in the open system interconnection (OSI) model in an example.

At (S2120), the server device transmits, to the client device, a first plurality of data messages over a first data plane channel that uses a second transport protocol. The first plurality of data messages belongs to a data plane of the bidirectional protocol and carries at least immersive media content, such as 3D graphic data.

In some examples, the first transport protocol is transmission control protocol (TCP) and the second transport protocol is user datagram protocol (UDP).

In some examples, the first transport protocol is a connection based transport protocol and can be bidirectional. The second transport protocol is a connectionless transport protocol, and can be unidirectional.

In some examples, the server device can setup the first data plane channel with the client device according to the plurality of control messages exchanged over the control plane channel.

In some examples, the server device can receive one or more specific characteristics of the client device over the control plane channel, and can adapt a media stream carried in the first plurality of data messages according to the one or more specific characteristics. In some examples, the one or more specific characteristics can include at least one of a computing resource of the client device, a storage resource of the client device, a service level agreement of a network service provider at the client device, an immersive application requirement, a type of the client device, a model of the client device, and a neural network model at the client device.

In some examples, the server device can receive, from the client device, a second plurality of data messages over a second data plane channel that uses the second transport protocol. The second plurality of data messages carries at least one of layer information of a neural network model at the client device and rendered media content by the client device. In an example, the server device can send the rendered media content by the client device to another client device.

In some embodiments, the client device is a first client device, and the plurality of control messages enables the server device to share the immersive media content with a second client device. In an example, the server device can receive, in response to a request from the server device, a list of types of assets that are sharable and uniform resource identifiers (URIs) for the assets that are cached in an immutable storage via the control plane channel from the first client device. In another example, the server device can receive, in response to a request from the server device, a status update of each asset that is accessible by the first client device via the control plane channel. In another example, the server device can receive, in response to a request from the server device, a current state of a particular asset type and one of a particular server assigned identifier and a particular asset uniform resource identifier (URI) via the control plane channel from the first client device. The server device can provide control messages to the second client device over a control plane channel between the server device and the second client device, the control messages can allow the second client device to access the immersive media content of the first client device, such as the cached assets.

Then, the process proceeds to (S2199) and terminates.

The process (2100) can be suitably adapted. Step(s) in the process (2100) can be modified and/or omitted. Additional step(s) can be added. Any suitable order of implementation can be used.

Figure 22:
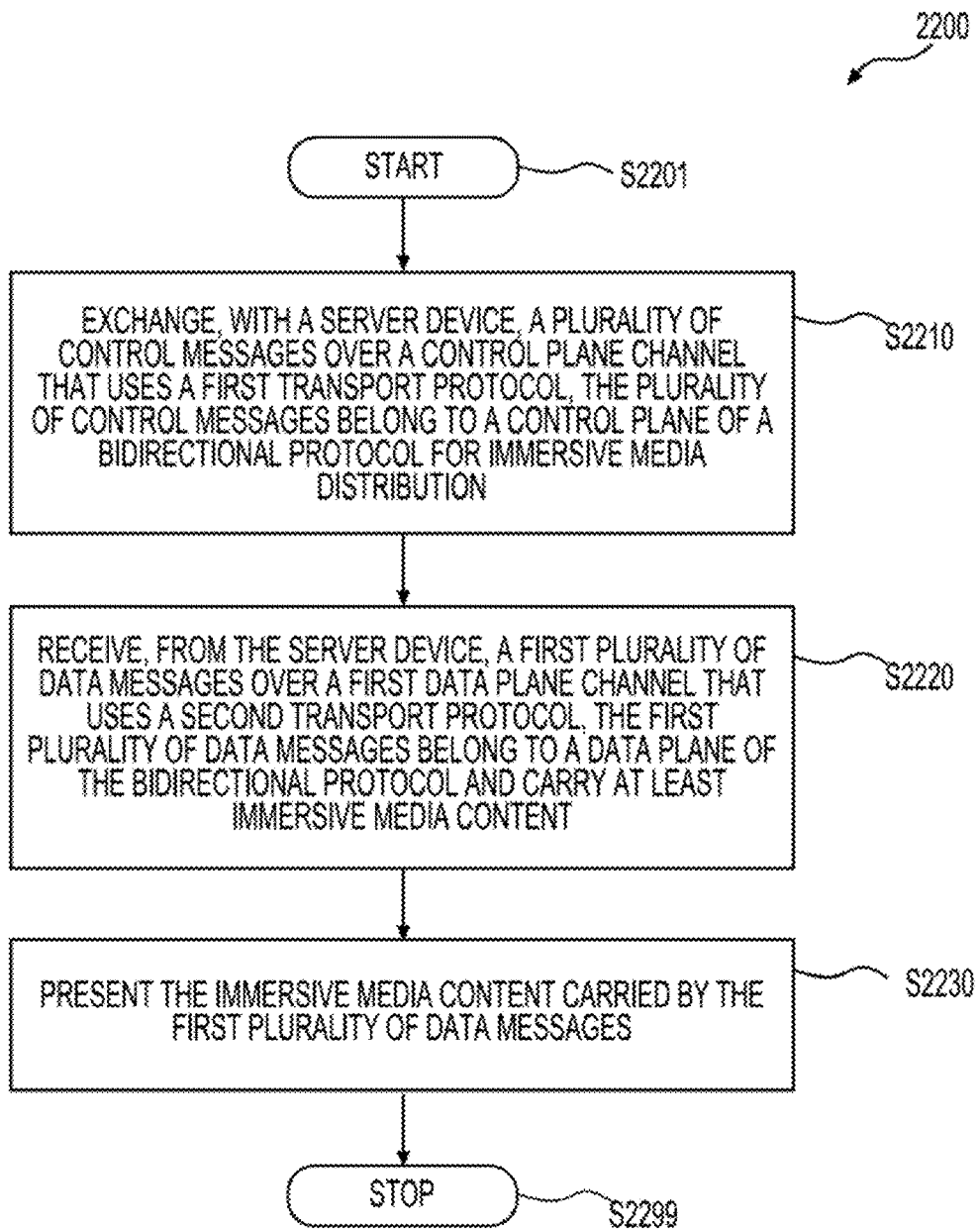
FIG. 22 shows a flow chart outlining another process according to some embodiment of the disclosure.

FIG. 22 shows a flow chart outlining a process (2200) according to an embodiment of the disclosure. The process (2200) can be used in a client device, such as the client device (2060A), the client device (2060B), the client device (2060C), and the like. In various embodiments, the process (2200) is executed by processing circuitry, such as the processing circuit (2070A), the processing circuit (2070B), the processing circuit (2070C) and the like. In some embodiments, the process (2200) is implemented in software instructions, thus when the processing circuitry executes the software instructions, the processing circuitry performs the process (2200). The process starts at (S2201) and proceeds to (S2210).

At (S2210), the client device exchanges, with a server device, a plurality of control messages over a control plane channel that uses a first transport protocol. The plurality of control messages belong to a control plane of a bidirectional protocol for immersive media distribution. The bidirectional protocol for immersive media distribution can be implemented in a network layer above transport layer, such as application layer, presentation layer, and the like in the open system interconnection (OSI) model in an example.

At (S2220), the client device receives, from the server device, a first plurality of data messages over a first data plane channel that uses a second transport protocol. The first plurality of data messages belongs to a data plane of the bidirectional protocol and carries at least immersive media content.

At (S2230), the client device can present the immersive media content carried by the first plurality of data messages.

In some examples, the first transport protocol is transmission control protocol (TCP) and the second transport protocol is user datagram protocol (UDP).

In some examples, the first transport protocol is a connection-based transport protocol and is bidirectional, and the second transport protocol is a connectionless transport protocol and is unidirectional.

In some examples, the client device sets up the first data plane channel with the server device according to the plurality of control messages exchanged over the control plane channel.

In some examples, the client device provides one or more specific characteristics of the client device to the server device over the control plane channel. The one or more specific characteristics includes at least one of a computing resource of the client device, a storage resource of the client device, a service level agreement of a network service provider at the client device, an immersive application requirement, a type of the client device, a model of the client device, and a neural network model at the client device.

In some examples, the client device can transmit to the server device, a second plurality of data messages over a second data plane channel that uses the second transport protocol. The second plurality of data messages carries at least one of layer information of a neural network model at the client device, or rendered media content by the client device.

In some examples, the client device is a first client device, and the plurality of control messages enables the server device to share the immersive media content with a second client device. In an example, the first client device provides, in response to a request from the server device, a list of types of assets that are sharable and uniform resource identifiers (URIs) for the assets that are cached in an immutable storage via the control plane channel. In another example, the first client device provides, in response to a request from the server device, a status update of each asset that is accessible by the first client device via the control plane channel. In another example, the first client device provides, in response to a request from the server device, a current state of a particular asset type and one of a particular server assigned identifier and a particular asset uniform resource identifier (URI) via the control plane channel. The server device can use the information received from the first client device to control the second client device to access the immersive media content, such as the cached assets.

Then, the process proceeds to (S2299) and terminates.

The process (2200) can be suitably adapted. Step(s) in the process (2200) can be modified and/or omitted. Additional step(s) can be added. Any suitable order of implementation can be used.

The techniques described above, can be implemented as computer software using computer-readable instructions and physically stored in one or more computer-readable media. For example, FIG. 23 shows a computer system (2300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 23:
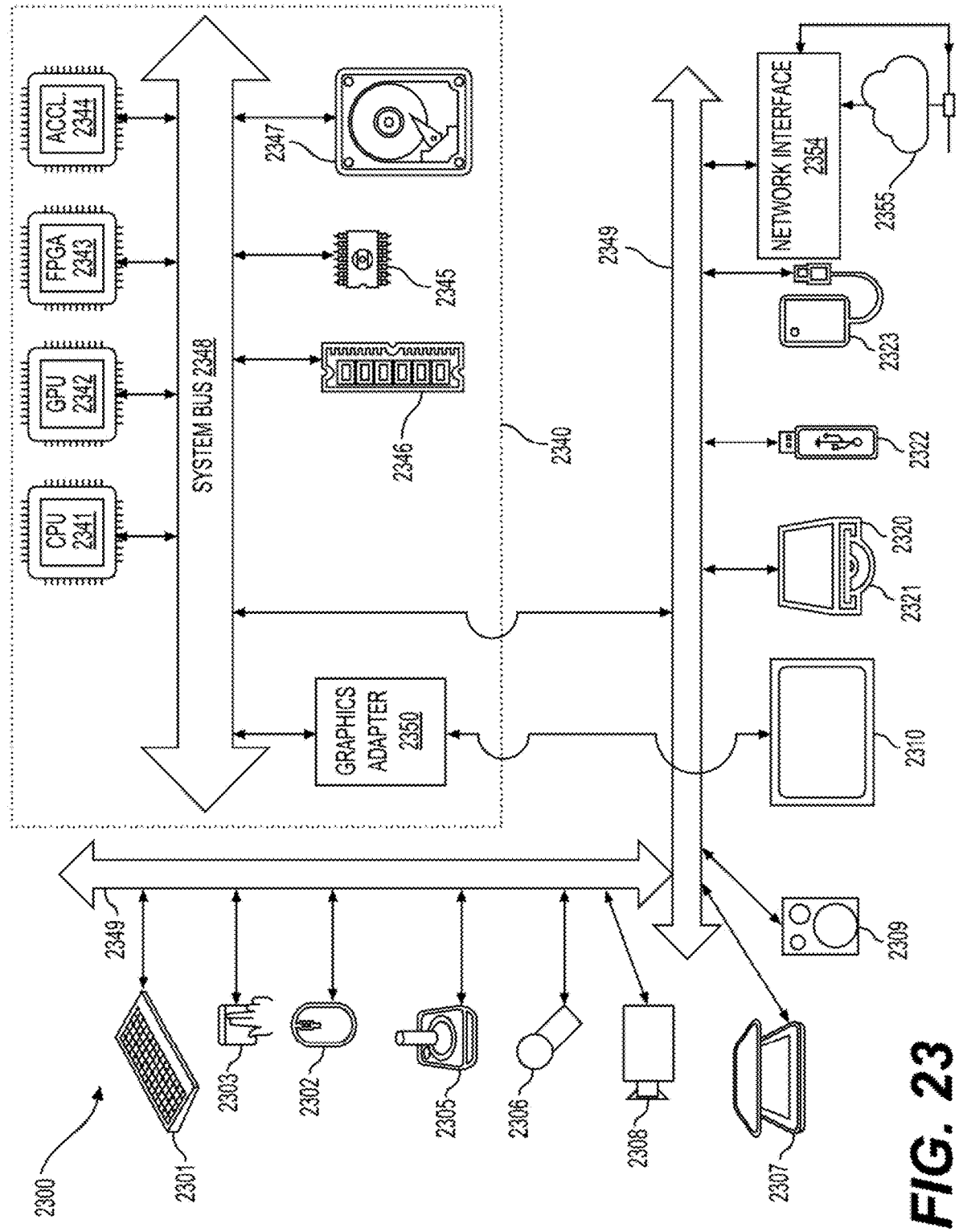
FIG. 23 is a schematic illustration of a computer system in accordance with an embodiment.

The components shown in FIG. 23 for computer system (2300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2300).

Computer system (2300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2301), mouse (2302), trackpad (2303), touch screen (2310), data-glove (not shown), joystick (2305), microphone (2306), scanner (2307), camera (2308).

Computer system (2300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2310), data-glove (not shown), or joystick (2305), but there can also be tactile feedback devices that do not serve as input devices), audio output devices (such as: speakers (2309), headphones (not depicted)), visual output devices (such as screens (2310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2300) can also include human accessible storage devices and their associated media such as optical media including CD/DVD ROM/RW (2320) with CD/DVD or the like media (2321), thumb-drive (2322), removable hard drive or solid state drive (2323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2300) can also include an interface (2354) to one or more communication networks (2355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2349) (such as, for example USB ports of the computer system (2300)); others are commonly integrated into the core of the computer system (2300) by attachment to a system bus as described below (for example Ethernet interface into a PC computer system or cellular network interface into a smartphone computer system). Using any of these networks, computer system (2300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2340) of the computer system (2300).

The core (2340) can include one or more Central Processing Units (CPU) (2341), Graphics Processing Units (GPU) (2342), specialized programmable processing units in the form of Field Programmable Gate Areas (FPGA) (2343), hardware accelerators for certain tasks (2344), graphics adapters (2350), and so forth. These devices, along with Read-only memory (ROM) (2345), Random-access memory (2346), internal mass storage such as internal non-user accessible hard drives, SSDs, and the like (2347), may be connected through a system bus (2348). In some computer systems, the system bus (2348) can be accessible in the form of one or more physical plugs to enable extensions by additional CPUs, GPU, and the like. The peripheral devices can be attached either directly to the core's system bus (2348), or through a peripheral bus (2349). In an example, the screen (2310) can be connected to the graphics adapter (2350). Architectures for a peripheral bus include PCI, USB, and the like.

CPUs (2341), GPUs (2342), FPGAs (2343), and accelerators (2344) can execute certain instructions that, in combination, can make up the aforementioned computer code. That computer code can be stored in ROM (2345) or RAM (2346). Transitional data can be also be stored in RAM (2346), whereas permanent data can be stored for example, in the internal mass storage (2347). Fast storage and retrieve to any of the memory devices can be enabled through the use of cache memory, that can be closely associated with one or more CPU (2341), GPU (2342), mass storage (2347), ROM (2345), RAM (2346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2300), and specifically the core (2340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2340) that are of non-transitory nature, such as core-internal mass storage (2347) or ROM (2345). The software implementing various embodiments of the present disclosure can be stored in such devices and executed by core (2340). A computer-readable medium can include one or more memory devices or chips, according to particular needs. The software can cause the core (2340) and specifically the processors therein (including CPU, GPU, FPGA, and the like) to execute particular processes or particular parts of particular processes described herein, including defining data structures stored in RAM (2346) and modifying such data structures according to the processes defined by the software. In addition or as an alternative, the computer system can provide functionality as a result of logic hardwired or otherwise embodied in a circuit (for example: accelerator (2344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of media streaming in a client device, comprising:
   exchanging, between the client device and a server device, a plurality of control messages over a control plane channel that uses a first transport protocol, the plurality of control messages including media asset information of media stored in the client device and belonging to a control plane of a bidirectional protocol for immersive media distribution;
   receiving, from the server device, a first plurality of data messages over a first data plane channel that uses a second transport protocol independent of the first transport protocol, the first plurality of data messages belonging to a data plane of the bidirectional protocol and carrying streaming immersive media content; and
   presenting the streamed immersive media content carried by the first plurality of data messages, wherein
   the control plane channel is set up between the client device and the server device, the first data plane channel is set up between the client device and the server device based on at least one of the plurality of control messages exchanged over the control plane channel.

2. The method of claim 1, wherein the first transport protocol is transmission control protocol (TCP), and the second transport protocol is user datagram protocol (UDP).

3. The method of claim 1, wherein the first transport protocol is a connection-based transport protocol, and the second transport protocol is a connectionless transport protocol.

4. The method of claim 1, further comprising:
providing one or more specific characteristics of the client device to the server device over the control plane channel, the one or more specific characteristics comprising at least one of:
a computing resource of the client device;
a storage resource of the client device;
a service level agreement of a network service provider at the client device;
an immersive application requirement;
a type of the client device;
a model of the client device; and
a neural network model at the client device.

5. The method of claim 1, further comprising:
transmitting, to the server device, a second plurality of data messages over a second data plane channel that uses the second transport protocol, the second plurality of data messages carrying at least one of:
layer information of a neural network model at the client device; and
rendered media content by the client device.

6. The method of claim 1, wherein the client device is a first client device, and the plurality of control messages enables the server device to share the media stored in the client device with a second client device.

7. The method of claim 6, wherein the media asset information includes a list of types of assets that are sharable and uniform resource identifiers (URIs) for the assets that are cached in an immutable storage of the client device via the control plane channel.

8. The method of claim 6, wherein the media asset information includes a status update of each asset that is accessible by the first client device via the control plane channel.

9. The method of claim 6, wherein the media asset information including a current state of a particular asset type and one of a particular server assigned identifier and a particular asset uniform resource identifier (URI) via the control plane channel.

10. A client apparatus for media streaming, comprising processing circuitry configured to:
exchange, between the client apparatus and a server device, a plurality of control messages over a control plane channel that uses a first transport protocol, the plurality of control messages including media asset information of media stored in the client apparatus and belonging to a control plane of a bidirectional protocol for immersive media distribution;
receive, from the server device, a first plurality of data messages over a first data plane channel that uses a second transport protocol independent of the first transport protocol, the first plurality of data messages belonging to a data plane of the bidirectional protocol and carrying streaming immersive media content; and
present the streamed immersive media content carried by the first plurality of data messages, wherein
the control plane channel is set up between the client apparatus and the server device,
the first data plane channel is set up between the client apparatus and the server device based on at least one of the plurality of control messages exchanged over the control plane channel.

11. The client apparatus of claim 10, wherein the first transport protocol is transmission control protocol (TCP), and the second transport protocol is user datagram protocol (UDP).

12. The client apparatus of claim 10, wherein the first transport protocol is a connection-based transport protocol, and the second transport protocol is a connectionless transport protocol.

13. The client apparatus of claim 10, wherein the processing circuitry is configured to:
provide one or more specific characteristics of the client apparatus to the server device over the control plane channel, the one or more specific characteristics comprising at least one of:
a computing resource of the client apparatus;
a storage resource of the client apparatus;
a service level agreement of a network service provider at the client apparatus;
an immersive application requirement;
a type of the client apparatus;
a model of the client apparatus; and
a neural network model at the client apparatus.

14. The client apparatus of claim 10, wherein the processing circuitry is configured to:
transmit, to the server device, a second plurality of data messages over a second data plane channel that uses the second transport protocol, the second plurality of data messages carrying at least one of:
layer information of a neural network model at the client apparatus; and
rendered media content by the client apparatus.

15. The client apparatus of claim 10, wherein the client apparatus is a first client device, and the plurality of control messages enables the server device to share the media stored in the apparatus with a second client device.

16. The client apparatus of claim 15, wherein the media asset information includes a list of types of assets that are sharable and uniform resource identifiers (URIs) for the assets that are cached in an immutable storage of the client apparatus via the control plane channel.

17. The client apparatus of claim 15, wherein the media asset information includes a status update of each asset that is accessible by the first client device via the control plane channel.

18. The client apparatus of claim 15, wherein the media asset information includes a current state of a particular asset type and one of a particular server assigned identifier and a particular asset uniform resource identifier (URI) via the control plane channel.

* * * * *